United States Patent
Torii et al.

(10) Patent No.: US 8,346,826 B2
(45) Date of Patent: Jan. 1, 2013

(54) SWITCH DEVICE, SYSTEM, BACKUP METHOD AND COMPUTER PROGRAM

(75) Inventors: Takashi Torii, Tokyo (JP); Satoshi Yamakawa, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 955 days.

(21) Appl. No.: 11/236,844

(22) Filed: Sep. 28, 2005

(65) Prior Publication Data

US 2006/0080370 A1 Apr. 13, 2006

(30) Foreign Application Priority Data

Sep. 29, 2004 (JP) .................................. 2004-284378

(51) Int. Cl.
*G06F 12/00* (2006.01)
*G06F 17/30* (2006.01)

(52) U.S. Cl. ........ 707/831; 707/640; 707/822; 707/828; 711/100; 711/154; 711/161; 711/162

(58) Field of Classification Search ........................ None
See application file for complete search history.

(56) References Cited

U.S. PATENT DOCUMENTS

| | | | | |
|---|---|---|---|---|
| 6,996,582 | B2 * | 2/2006 | Daniels et al. ................ | 707/200 |
| 7,236,987 | B1 * | 6/2007 | Faulkner et al. ........... | 707/104.1 |
| 7,467,167 | B2 * | 12/2008 | Patterson ............... | 707/999.204 |
| 2003/0097454 | A1 | 5/2003 | Yamakawa et al. | |
| 2003/0182301 | A1 | 9/2003 | Patterson et al. | |
| 2003/0220985 | A1 | 11/2003 | Kawamoto et al. | |
| 2004/0107222 | A1 * | 6/2004 | Venkatesh et al. ............ | 707/200 |
| 2004/0220971 | A1 * | 11/2004 | Kaushik et al. ............... | 707/200 |
| 2004/0254962 | A1 * | 12/2004 | Kodama et al. ............... | 707/201 |
| 2005/0021565 | A1 * | 1/2005 | Kapoor et al. ................ | 707/200 |
| 2005/0027749 | A1 * | 2/2005 | Ohno et al. ................... | 707/200 |
| 2005/0071390 | A1 * | 3/2005 | Midgley et al. ............... | 707/204 |

FOREIGN PATENT DOCUMENTS

| | | |
|---|---|---|
| JP | 2000-276391 A | 10/2000 |
| JP | 2003-203029 A | 7/2003 |
| JP | 2003-345643 A | 12/2003 |
| JP | 2004-38929 A | 2/2004 |
| JP | 2004-54607 A | 2/2004 |

OTHER PUBLICATIONS

"HP JFS 3.3/HP OnLineJFS 3,3 VERITAS® File System 3.3 System Management Guide", 4 Online Backup, pp. 75-81, Internet <URL http://docs/hp/com/ja/B3929_90012/pdf>.

(Continued)

*Primary Examiner* — Jau-Shya Meng
(74) *Attorney, Agent, or Firm* — Sughrue Mion, PLLC

(57) ABSTRACT

A system which includes at least one client, a plurality of file servers, each having a file system, and a switch logically arranged between the client and the plurality of file servers to provide file access services which virtually render the plurality of file systems accessible as a single file system, termed a 'pseudo file system', when viewed from the terminal. The switch distributes a command that starts generation of snapshots to the plurality of file servers, which file servers formulate respective snapshots responsive to the command that starts formation of the snapshots. The switch sets the plurality of snapshots, generated by the plurality of file servers, so as to be associated with the file system structure of the virtual file system at the time of formation of the snapshots.

13 Claims, 14 Drawing Sheets

OTHER PUBLICATIONS

Wataru Katsurashima, Design and evaluation of CIFS server virtualization methods, IEICE Technical Report, Japan, IEICE, Jul. 29, 2003, vol. 103, No. 248, p. 73-78.

Satoshi Yamakawa, NAS switches: Development of integrated virtualization technology for NFS servers, IEICE Technical Report, Japan, IEICE, Aug. 15, 2002, vol. 102, No. 275, p. 13-18.

Yoshiko Yasuda, "On-line Backup Function of X-NAS: a Clustered NAS System", The Institute of Electronics, Information and Communication Engineers, Technical Report of IEICE, Aug. 2003, pp. 7-12.

"Solaris 9", Unix Magazine, May 2003, pp. 32-45.

Satoshi Yamakawa, "A Study on Virtualization for File Servers", Information Processing Society of Japan, Mar. 12, 2002, pp. 3-501 to 3-502.

J. Ishikawa, "SAN, NAS", Journal of Society of Instrument & Control Engineers, Jun. 2002, pp. 456-462.

Shinichi Kawamoto, "Autonomic File Rebalancing Policy of X-NAS: a Clustered NAS System", The Institute of Electronics, Information and Communication Engineers, Technical Report of IEICE, Aug. 2003, p. 1-6.

* cited by examiner

SWITCH DEVICE, SYSTEM, BACKUP METHOD AND COMPUTER PROGRAM

FIELD OF THE INVENTION

This invention relates to a switch device logically arranged between a client and file servers. More particularly, it relates to a switch device in a system providing file access services to plural file systems, as a virtual file system, as viewed from the client, in which the switch device may efficiently carry out snapshotting and backup/restore operations, and method as well as a computer program for efficiently carrying out the snapshotting and backup/restore operations.

BACKGROUND OF THE INVENTION

As a network storage system employing the NFS (Network File System)/CIFS (Common Internet File System), as a protocol, and which enables accessing the file systems from plural hosts, the NAS (Network Attached System), for example, is currently used. The NAS means a computer or a device co-owning files via NFS and CIFS.

Data recorded in a storage are periodically backed up on a medium, such as a tape, in order to make it possible to restore data for the possible case e.g. of occurrence of malfunctions. Of these backed-up data, a snapshot is a read-only file system holding an image of a file system structure at a certain point in time. By taking the snapshot, a fixed image of the file system structure at the time point of formation of the snapshot may be accessed, while data at the time point of formation of the snapshot may be restored, that is, the logical volume may be restored. For this reason, the snapshot may be used as an example for taking consolidated backup of the snapped file system. As for the snapshot, reference may be had to e.g. the Patent Document 1 and the Non-Patent Document 1. According to the present invention, the processing for interlinking the plural snapshots is carried out, as later explained. For aiding in the understanding of the relevant technology, the snapshot will now be explained, based on the description of the Patent Document 1. Meanwhile, in this Patent Document 1, there is disclosed a method for managing a plurality of snapshots in case these snapshots are supplied. With this method, a series of metadata representing a file system are included in the file system, so that snapshot of the file system will include relevant metadata.

If an image of a file system structure at a certain point in time has snapped a file system as shown for example in FIG. 13A, a snapshot inode, shown for example in FIG. 13B, is generated as an image of a file system structure at a certain point in time. Meanwhile, the inode is a data structure for a file system layer to specify a file. A snapshot inode is a replication of a root inode of a file system structure and includes the pointer information to an inode indirect block, an inode file data block and to file data blocks A to C, as in FIG. 13A. Since the snapshot may be generated by simply acquiring the pointer information, the time needed for generating the snapshot is on the order of several seconds, even for a large volume of data. If, after generating the snapshot, the file data block C, for example, is changed, the inode file data block, pointing to the so changed file data block, is changed to reflect a new location C' of the so changed file data block (in the case of WAFL (Write Anywhere File Layout)), as shown in FIG. 13C. The snapshot inode includes a pointer pointing to the original inode file system indirect block, while the inode file data block includes pointers to the original file data blocks A to C. That is, the snapshot holds a fixed image of the file system as of the snapping time point. On the other hand, the newly written inode file data block holds pointers to the file data blocks A and B and the pointer information to the changed file data block C'. There is also known a configuration in which, when a snapped file system is subsequently changed, pre-change data, such as the file data block C of FIG. 13C, is copied to a snapshot area, and in which, in reading the snapshot, the changed original data, such as the file data block C of FIG. 13C, for example, is read from the snapshot (see e.g. Non-Patent Document 1).

If, after generation of a snapshot, a file is changed, the inode structure of the file system may be restored to that at the time point of snapshot generation, by accessing the snapshot inode. More specifically, by following the pointers retained by the snapshot inode, through the inode file indirect block and the inode file data block, up to the unchanged file data blocks A to C, the file system structure may be restored up to the state at the time point of formation of the snapshot. It is noted that the 'SNAPSHOT' is a trademark owned by Network Appliance Inc. However, of course, the 'snapshot' in the context of the present specification is not limited to the snapshot directed to the WAFL (Write Anywhere File layout) of Network Appliance Inc. and means a fixed image of a file system.

As for use of the snapshots, the date and time of snapshot generation may be recorded, by way of generation management, and plural snapshots may be managed within the same file system, depending on the particular type of the snapshot forming software. The file system structure snapped may be accessed via e.g. an alias.

The basic configuration of the backup/recovery of the file servers in the conventional network file system environment is the individual backup/recovery by each file server. In this case, a client accesses a file server, such as NAS, by e.g. an NFS protocol, over a network, to make a remote login. Or, the client makes a local login to take a backup on e.g. a local tape drive, using CLI (Command Line Interface), such as rsh or ssh. Alternatively, such a method may be used in which a backup server, as a computer responsible for taking a backup, is NFS/CIFS mounted to a file system of a backup client (file server computer), to take a backup. Still alternatively, a backup client (file server) may be connected to a backup server, using a protocol other than the NFS protocol, such as SCSI (Small Computer System Interface), as with the NDMP (Network Data Management Protocol) prescribing the backup/recovery communication protocol between a primary storage (storage for storing a file system currently in use) and a secondary storage (storage for data retention), or a tape library may be co-owned by plural file servers.

There is also known a configuration in which a switch 100', virtually consolidating the resources of plural file servers 3, is logically provided across the file servers 3 and the client 1, for consolidating the plural file systems, in order to provide file services of a virtually single system image, that is, SSI (Single System Image), as shown in FIG. 14 (see e.g. Patent Documents 2 and 3, indicated hereinbelow). This switch 100' provides file services of the single system image, such as a single NAS, by consolidating and managing plural servers, without tampering with pre-existing systems, provided only that the client and the server support the standard protocol (NFS). Reference is also made to the disclosure of, for example, the Patent Document 4, as a similar virtual file system technique, a system for virtually unifying plural network storages to a single storage, to enable accessing from the client to, as it were, a single network storage. The system differs in configuration from the switch 100' of FIG. 14.

[Patent Document 1]
  JP Patent Kokai Publication No. JP-P2004-38929A
[Patent Document 2]
  JP Patent Kokai Publication No. JP-P2003-203029A
[Patent Document 3]
  JP Patent Kokai Publication No. JP-P2004-54607A
[Patent Document 4]
  JP Patent Kokai Publication No. JP-P2003-345643A

[Non-Patent Document 1]

'HP JFS 3.3/HP OnlineJFS 3.3VERITAS@ File System 3.3System Management Guide', 4Online Backup, p75to 81

SUMMARY OF THE DISCLOSURE

By taking a snapshot, the file system at the snap time point can be restored. In a file server, the backup/restore is a crucial maintenance management operation, such that, depending on the system management configuration, it is necessary to take snapshots periodically every hour, every day, every week or every month to hold hysteresis a preset number of times. In a conventional system, snapshots and backup/restore are carried out from one file server to another, and hence the management is complicated and a large number of management steps is involved.

In the system shown in FIG. 4, the plural file systems are hidden from the client 1 and virtualized as a single system, while on-line data migration is carried out in combination to relieve the load of the server administrator at the time of adding or replacing file servers. However, the snapshot, backup and restore are carried out individually, from one file server 3 to another, such that cooperation among the devices is not presumed nor considered. Although fairly acceptable management tools are supplied from vendors of the file servers, such as NAS devices, these tools are configured to output the status of the NAS or commands on a single screen, while not supplying a technique of allowing the plural file systems to look as a single file system, as with a virtual file system.

If, in the system shown in FIG. 14, the snapshot and backup/restore of the file systems are carried out separately from one file system to another, the work load and the number of steps are increased. Moreover, since the file systems are configured to appear to the client as a single file system, through the switch 100', it is necessary for the administrator to take a mapping between the virtual file system and the real file system, in taking a backup, by onerous operations. If, in taking a backup, plural file systems are backed up, without taking the mapping between the plural file systems (real file systems), formed into a sole virtual file system, and the virtual file system, recovery after malfunctions encounters significant difficulties in restoring the original virtual file system, because of lack of the mapping information. In addition, if the administrator commits a mistake in taking the mapping between the virtual file system and the real file systems, significant difficulties are met in restoring the virtual file system.

Thus, the present inventors have become aware of the fact that, in a system which hides the plural file systems from the client to allow the file systems to appear as a sole virtual file system, it is desirable to implement integrated maintenance management functions on the virtual file system level.

Accordingly, it is an object of the present invention to provide a device, a system, a method for backup and restore, and a computer program, in which the device is logically arranged between plural file systems and a terminal to provide to the terminal access services of an apparently single file system, corresponding to plural real file systems, and in which the device has the function of taking a backup and executing backup/recovery management to improve maintenance, management performance, reliability and safety.

The above and other objects are attained by the present invention configured as follows:

In accordance with one aspect of the present invention, there is provided a backup management system comprising:

a plurality of file devices, each including a file system;

means for commanding said plurality of file devices to start the generation of snapshots, which are fixed images of said file systems at a certain point in time;

said plurality of file devices generating respective snapshots responsive to a command for starting the generation of said snapshots; and means for setting a link across said snapshots to generate a virtual snapshot so that said snapshots generated by said file devices corresponds to a consolidated file system structure of said file systems at the time of generation of said snapshots;

whereby backup or restore may be made using said virtual snapshot.

According to the present invention, there is provided a file access service system comprising:

at least one terminal;

a plurality of file devices, each including a file system; and an intermediate device logically arranged between said terminal and said plurality of file devices, said intermediate device supplying said terminal with a file access service which allows said terminal to access said plural file systems as a single file system, termed hereinafter a 'pseudo file system';

said intermediate device including means for commanding each of said file devices to start generating a snapshot which is a fixed image, at a certain point in time, of said file system of each of said plurality of file devices;

each of said plurality of file devices generating a snapshot responsive to a command from said intermediate device for starting to generate the snapshot;

said intermediate device also including means for setting a link across said plural snapshots so that a plurality of said snapshots generated by said plurality of file devices correspond said pseudo file system at the time of generation of said snapshots.

Preferably, in the file access service system according to the present invention, said intermediate device holds, as the snapshot information corresponding to said pseudo file system, link information of junctions connecting said snapshots.

Preferably, in the file access service system according to the present invention, said intermediate device includes means for exercising control for halting the access to said file systems in starting to generate said snapshots.

Preferably, in the file access service system according to the present invention, said intermediate device includes means for exercising control for having snapshots generated by said file devices after checking for synchronization in file accessing between said file devices and said terminal.

Preferably, in the file access service system according to the present invention, said intermediate device includes means for exercising control for restarting the access to said file systems after generation of said snapshots.

Preferably, in the file access service system according to the present invention, said intermediate device assigns the same generation name to each snapshot generation of said file systems.

According to the present invention, the snapshot may be read out by the terminal for taking backup.

According to the present invention, there may be provided a device for taking a backup having an interface for communicating with an intermediate device. The device for taking a backup receives the information of the pseudo file system from the intermediate device and associates the virtual file system with the actual file system. The resulting information is backed up as a set with backup data.

According to the present invention, the intermediate device in restoration determines the destinations for restoration of the file systems, based on the pseudo file system information.

According to the present invention, the device for taking a backup restores the file systems, based on the pseudo file system information, it backs up, and further restores the virtual file system information on the intermediate device.

Preferably, in the file access service system according to the present invention, the snapshots generated by said file devices are read by said terminal to take backup of a backup image corresponding to said snapshots in a recording device for backup.

Preferably, in the file access service system according to the present invention, there are further provided a backup control device;

said backup control device receiving, in taking backup, a plurality of file systems of said plural file devices, via said intermediate device, to take a backup in a recording backup device as a single virtual file system structure of said plural file systems.

Preferably, in the file access service system according to the present invention, in restoration, said backup control device directly restores a single virtual file system of said plural file systems from said recording backup device to a target file device without the intermediary of said intermediate device.

Preferably, in the file access service system according to the present invention, there are further provided a backup control device for communication coupling to a plurality of said file devices;

said backup control device having an interface for communicating with said intermediate device;

said backup control device in taking a backup receiving plural file systems of said plural file devices via said intermediate device and taking a backup of said plural file systems in said recording backup device as a single virtual file system structure of said plural file systems.

Preferably, in the file access service system according to the present invention, said backup control device in restoration sends backup data of said recording backup device to said intermediate device; and said intermediate device distributes the backup data, received from said backup control device, to a plurality of said file devices for restoration, in keeping with the pseudo file system information configured for allowing a plurality of said file systems to look as a single file system.

Preferably, in the file access service system according to the present invention, there is further provided a backup control device for communication coupling to a plurality of said file devices;

said backup control device having an interface for communicating with said intermediate device;

said backup control device in taking a backup receiving plural snapshots of said plural file devices via said intermediate device; a link being set across said plural snapshots; said plural snapshots, said link is set to, being backed up in said recording backup device.

Preferably, in the file access service system according to the present invention, said backup control device in restoration sends the backup data of said recording backup device to said intermediate device;

said intermediate device distributing and transmitting said plural snapshots to said plural file devices;

said plural file devices restoring the file systems using said snapshots transmitted thereto.

Preferably, in the file access service system according to the present invention, there is further provided a backup control device for communication coupling to a plurality of said file devices;

said backup control device having an interface for communicating with said intermediate device;

said backup control device in taking a backup receiving from said intermediate device the pseudo file system information configured for allowing a plurality of said file systems to look as a single file system; said backup control device correlating said pseudo file system information to the actual file systems to take a backup of the so correlated information as a set with backup data.

Preferably, in the file access service system according to the present invention, in restoration, the backup data is transferred from said recording backup device to a plurality of said file devices, and wherein said pseudo file system information is transmitted from said backup control device to said intermediate device.

Preferably, in the file access service system according to the present invention, said intermediate device is a switch device logically arranged between said terminal forming a client and a plurality of server devices each forming said file device;

said switch device receiving a file access request from said client; said switch device distributing said file access request to appropriate server devices and transmitting the so distributed file access request; said switch device receiving a response to said file access request transmitted from said server devices to transfer said response to said terminal which transmitted said file access request.

Preferably, in the file access service system according to the present invention, said switch device includes means for transmitting a request, pertinent to an object, sent from said client, to said server device supervising said object;

said means transmitting a response to said request from said server device to said client as a source of transfer of said request; said means inserting into the transmitted response the server identification information for discriminating a server device, supervising an object associated with an original object ID generated in said server device, from other server devices, for identifying said object, in case said original object ID is included in the transmitted response, and rewriting said original object ID to an information carrying object ID; said means in case said information carrying object ID is included in the transmitted request restoring said information carrying object ID into said original object ID.

Preferably, in the file access service system according to the present invention, said switch device stores and supervises, as said pseudo file system information, the information pertinent to nodes of directory trees of a unified single directory tree combined from the directory trees of said plural file systems, as said pseudo file system information.

Preferably, in the file access service system according to the present invention, said server device is a NAS (Network Attached Storage) device and wherein said switch device allocates said file access request to said servers using the predetermined layer information.

In another aspect, the present invention provides a method for taking a backup in a file access service system, comprising at least one terminal; a plurality of file devices, each including a file system; and an intermediate device logically arranged between said terminal and said file devices; said intermediate device providing file access services which virtually render said plural file services accessible as a single file system, termed a 'pseudo file system', when viewed from said terminal; said method comprising the steps of said intermediate device distributing a command for starting to generate a snapshot, as a fixed image of a file system at a certain point in time, to a plurality of said file devices;

said plural file devices receiving a command for starting to take snapshots from said intermediate device to formulate respective snapshots; and said intermediate device setting a link across a plurality of said snapshots so that said snapshots generated by said file devices are in correspondence with said pseudo-file system at the time of generation of said snapshots.

Preferably, the backup method according to the present invention, further comprises the steps of said intermediate device holding the link information of junctions connecting said snapshots as the snapshot information corresponding to said pseudo-file system.

Preferably, the backup method according to the present invention, further comprises the steps of said intermediate device exercising control for halting the access to said file systems in starting to take snapshots.

Preferably, the backup method according to the present invention, further comprises the steps of said intermediate device exercising control for first confirming synchronization relating to file access across said file devices and said terminal and for subsequently allowing said plural file devices to take snapshots.

Preferably, the backup method according to the present invention, further comprises the steps of said intermediate device exercising control for first generating snapshots and for subsequently restarting to access said file systems.

Preferably, the backup method according to the present invention, further comprises the step of said intermediate device assigning the same generation name to each snapshot generation of said file systems.

Preferably, the backup method according to the present invention, further comprises the step of reading out the snapshots generated by said file devices by said terminal to take backup of backup images corresponding to said snapshots in a recording device for backup.

Preferably, the backup method according to the present invention, further comprises the step of providing a backup control device;

said backup control device receiving, in taking backup, a plurality of file systems of said plural file devices, via said intermediate device, to take a backup of said file systems in a recording backup device as a single virtual file system structure of said plural file systems. In a method for restoration according to the present invention, in restoring data backed up by the back up method, said backup control device directly restores a single virtual file system of said plural file systems from said recording backup device to a target file device without the intermediary of said intermediate device.

Preferably, the backup method according to the present invention, further comprises providing a backup control device for communication coupling to a plurality of said file devices and to said intermediate device;

said backup control device in taking a backup receiving plural file systems of said plural file devices via said intermediate device and taking a backup of said plural file systems as a single virtual file system structure of said plural file systems in said recording backup device. In a method for restoring data backed up by the said method comprises the steps of said backup control device in restoration sending backup data of said recording backup device to said intermediate device; and said intermediate device distributing the backup data to a plurality of said file devices, for restoration, based on the pseudo file system information configured for allowing a plurality of said file systems to look as a single file system.

Preferably, the backup method according to the present invention, further comprises a backup control device for communication coupling to a plurality of said file devices;

said backup control device in taking a backup receiving plural snapshots of said plural file devices via said intermediate device; a link being set across said plural snapshots; said plural snapshots, said link is set to, being backed up in said recording backup device. In the method for restoration of data backed up by the method, said backup control device in restoration of the backed up data sends the snapshots of said recording backup device to said intermediate device;

said intermediate device distributing and transmitting said plural snapshots to said plural file devices;

said plural file devices restoring the file systems based on said snapshots transmitted thereto.

Preferably, the backup method according to the present invention, further comprises providing a backup control device for communication coupling to a plurality of said file devices;

said backup control device in taking a backup receiving from said intermediate device the pseudo file system information configured for allowing a plurality of said file systems to look as a single file system; said backup control device correlating said pseudo file system information to the actual file systems to take a backup of the so correlated information as a set with backup data. In the method for restoration of data backed up by the back up method, in restoration, the backup data is transferred from said recording backup device to a plurality of said file devices, and wherein said pseudo file system information is transmitted from said backup control device to said intermediate device.

Preferably, in the backup method according to the present invention, said intermediate device is a switch device logically arranged between said terminal forming a client and a plurality of server devices each forming said file device;

said switch device receiving a file access request from said client; said switch device distributing said file access request to appropriate server devices and transmitting the so distributed file access request; said switch device receiving a response to said file access request transmitted from said server devices to transfer said response to said terminal which transmitted said file access request.

Preferably, in the backup method according to the present invention, said switch device transmits a request, pertinent to an object, sent from said client, to said servers supervising said object;

a response to said request from said server device is transmitted to said client as a source of transfer of said request; and wherein the server identification information for discriminating a server device, supervising an object associated with an original object ID generated in said server device, from other server devices, is inserted into a transmitted response, for identifying said object, in case said original object ID is included in the transmitted response, and said original object ID is rewritten to an information carrying object ID; said information carrying object ID being restored into said original object ID in case said information carrying object ID is included in the transmitted request.

Preferably, in the backup method according to the present invention, said switch device stores and supervises, as said pseudo file system information, the information pertinent to nodes of directory trees of a unified single directory tree combined from the directory trees of said plural file systems, as said pseudo file system information.

Preferably, in the backup method according to the present invention, said server device is a NAS (Network Attached Storage) device and wherein said switch device distributes said file access request to said servers using the predetermined layer information.

According to yet another aspect of the present invention, there is provided a switch device logically arranged between at least one client and a plurality of file servers, each provided with a file system, for providing file access services which virtually render said plural file systems accessible as a single file system, termed a 'pseudo file system', when viewed from said client; said switch device comprising means for distributing a command for starting to generate a snapshot, as a fixed image of a file system at a certain point in time, to a plurality of said file servers; and means for setting a link across a plurality of said snapshots so that said snapshots generated by said file servers on receipt of a command for staring to generate the snapshots so that said snapshots are in correspondence with said pseudo-file system at the time of generation of said snapshots.

Preferably, in the switch device according to the present invention, the link information of junctions connecting said snapshots is retained as the snapshot information corresponding to said pseudo-file system.

Preferably, the switch device according to the present invention, further comprises means for exercising control for halting the access to said file systems in starting to take snapshots.

Preferably, the switch device according to the present invention, further comprises means for exercising control for first confirming synchronization relating to file access across said file servers and said client and for subsequently allowing said plural file devices to take snapshots.

Preferably, the switch device according to the present invention, further comprises means for exercising control for first generating snapshots and for subsequently restarting to access said file systems.

Preferably, in the switch device according to the present invention, the same generation name is assigned to each snapshot generation of said file systems.

According to another aspect of the present invention, there is provided a computer program for a computer constituting a switch device logically arranged between at least one client and a plurality of file servers, each provided with a file system, for providing file access services which virtually render said plural file systems accessible as a single file system, termed a 'pseudo file system', when viewed from said client, said program causing said computer to execute the processing of distributing a command for starting to generate a snapshot, as a fixed image of a file system at a certain point in time, to a plurality of said file servers; and setting a link across a plurality of said snapshots so that said snapshots generated by said file servers on receipt of a command for snapshotting to generate the snapshots so that said snapshots are in correspondence with said pseudo-file system at the time of generation of said snapshots.

Preferably, in the program according to the present invention, the link information of junctions connecting said snapshots is retained as the snapshot information corresponding to said pseudo-file system.

Preferably, the program according to the present invention, further comprises the processing of exercising control for halting the access to said file systems in starting to take snapshots.

Preferably, the program according to the present invention, further comprises the processing of exercising control for first confirming synchronization relating to file access across said file servers and said client and for subsequently allowing said plural file devices to take snapshots.

Preferably, the program according to the present invention, further comprises the processing of exercising control for first generating snapshots and for subsequently restarting to access said file systems.

Preferably, the program according to the present invention, the same generation name is donated to each snapshot generation of said file systems.

The meritorious effects of the present invention are summarized as follows.

According to the present invention, there is provided a system for supporting file system access services to a virtualized file system for plural real file systems, in which an administrator is able to manage the snapshotting and backup/restore as a virtualized device, whereby the number of management steps may be decreased appreciably.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Figure 1:
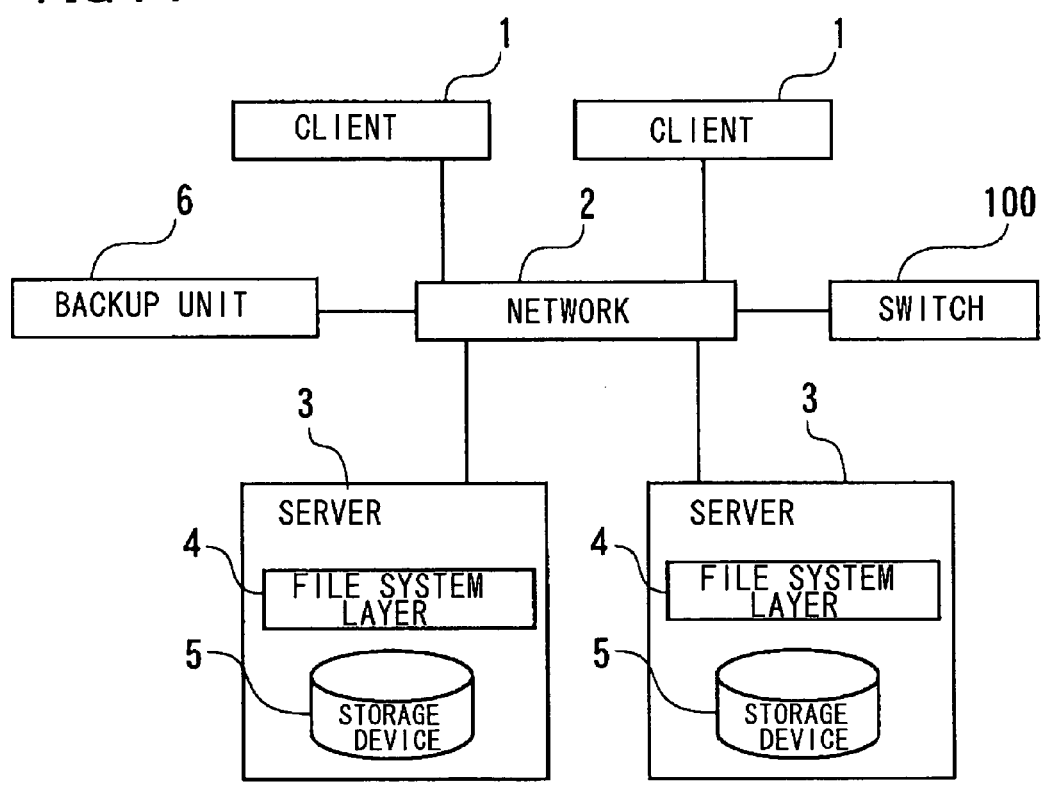
FIG. 1 is a diagram showing system configuration of an embodiment of the present invention.

An embodiment of the present invention will now be described. Referring to FIG. 1, a system according to an embodiment of the present invention includes a switch 100 which is logically arranged between the client 1 and the file devices. The switch 100 provides file access services which virtually render the plural file services accessible as a single file system, termed a 'pseudo file system', when viewed from the terminal. The switch has the function of performing integrated management of the snapshotting and backup/restoring of plural file systems, as a single virtual file system.

A snapshot command is entered to the switch 100. This inputting is achieved by a command over a network 2, or login at the switch 100.

The switch 100 receives the snapshot command and distributes the command to a plurality of file servers 3 to take respective snapshots. Each file server 3 is assumed to be provided with snapshot function.

With the switch 100, it is possible to halt file access in timed relation to the snapshotting (to freeze the snapped file system) and to take a point of quiescence (check point) of the virtual file system.

The switch 100 then sets a link across the snapshots of the respective file systems, in accordance with a consolidated directory tree, corresponding to a single file system (termed a pseudo file system), obtained by virtualizing plural file systems with the link set across the plural snapshots, the plural snapshots are virtualized in accordance with the pseudo file system. The switch 100 manages the information for virtualization of snapshots. In this manner, data of the plural snapshots may be made to coincide with data of the pseudo file system.

The switch 100 also donates, for management, the same generation name by a command to the snapshots of the same generation of the file systems of the respective servers 3.

Next, backup taking by the snapshots will be described. If, in taking a backup to a backup unit 6, a client 1, for example, takes a backup over the network 2, the client reads out the snapshots from the plural file servers 3. At this time, the client 1 is able to read out, via switch 100, a plural number of virtualized snapshots. A backup image of the pseudo file system structure at the time point of generation of the virtualized snapshots is backed up on a recording medium, such as tape. That is, according to the present invention, a virtualized snapshot structure is formed by plural snapshots by the switch 100 setting a link across plural snapshots. Since the structure of the virtualized snapshots coincides with the file system structure of the pseudo file system as of the snapshotting time point, the pseudo file system as of the snapshotting time point can be backed up and restored. This represents a principal feature of the present invention.

Figure 8:
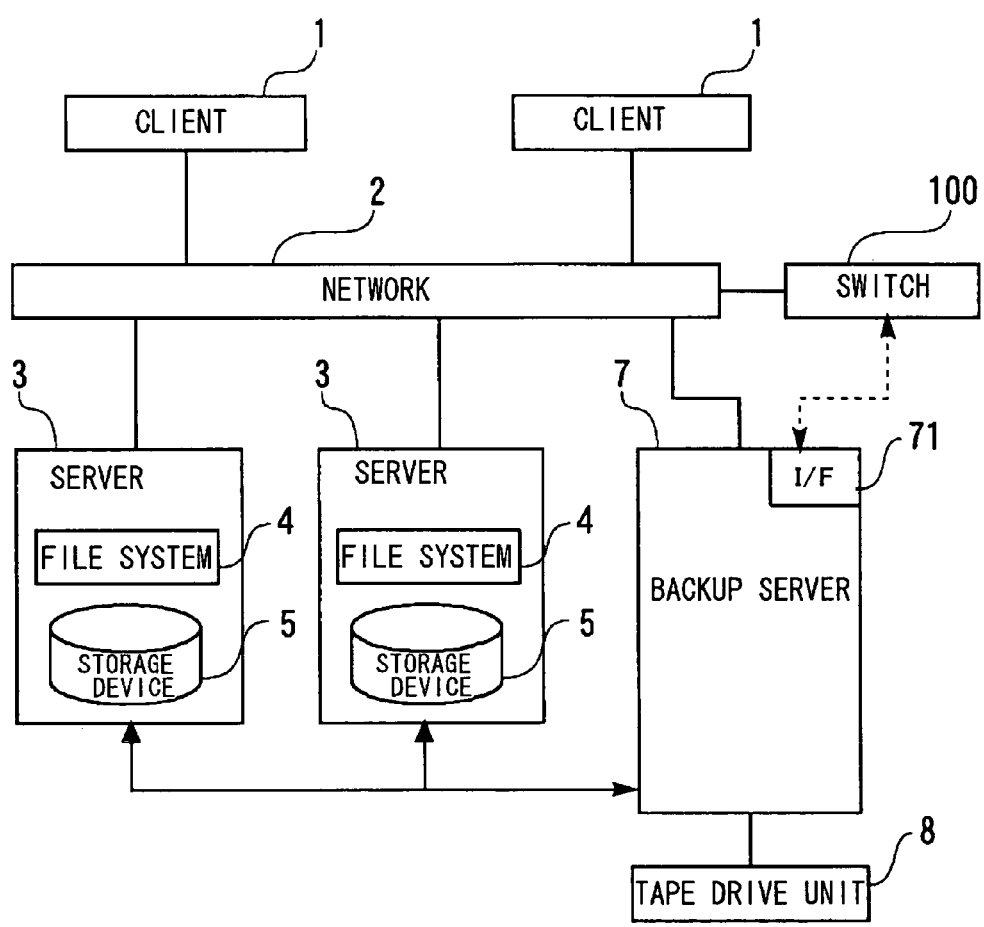
FIG. 8 is a diagram showing system configuration of another embodiment of the present invention.

In taking backup to a tape drive unit, not shown, locally connected to the file server, or in taking backup with NDMP (Network Dump Management Protocol) or SCSI (Small Computer System Interface), a backup server 7 takes backup of each file server 3, as shown in FIG. 8.

The backup server 7 includes an interface (71 of FIG. 8), configured for cooperating with the switch 100. The pseudo file system information for turning real file systems into a sole virtual file system that looks as a single file system is delivered from the switch 100 to the backup server 7.

The backup server 7 correlates the pseudo file system information with the servers 3 and takes a backup of the so correlated pseudo file system information as a set with data files on tape drives 8.

Thus, according to the present invention, it is possible to take backup in accordance with the unified directory tree of the pseudo file system. In the conventional system, an administrator has to map the pseudo file system information with the real file systems to take a backup, as described above. This operation may be eliminated with the present invention.

The restoring operation according to the present invention will be described. In case backup has been stored in the backup unit 6 through the client 1, in FIG. 1, a backup image, coincident with the file system structure of the pseudo file system, is stored in the backup unit 6, as described above. Thus, in restoring the backup image in the sole file server 3, the switch 100 does not take part in the restoring operation. That is, the backup image is directly restored from the backup unit 6 to the file server 3, operating as a target. Of course, the client 1 may access the restored file system via switch 100. The correspondence between the objects of the file system and the servers for storing the objects is supervised by the switch 100, and file access requests from the client are allocated via switch 100 to relevant servers 3.

If, in the restore operation, the pseudo file system, supervised by the switch 100, is restored to plural file servers 3, the switch determines the restore destinations for the backup data, based on the pseudo file system information corresponding to the backup image. This restores file systems, corresponding to the consolidated directory trees, at the time point of formation of the snapshots.

In case backup is taken with the protocol other than the NFS protocol, such as NDMP or SCSI, a backup server 7 restores the file systems to the file servers 3, based on the pseudo file system information, as shown in FIG. 8. The backup server 7 restores the pseudo file system information, backed up to the tape drives 8, to the switch 100. In this manner, the pseudo file system at the time point of the snapshotting may be regenerated via switch 100.

Thus, in a network file system, formed into a single file system, as a virtual file system, from the plural file systems, in an embodiment of the present invention, an administrator may comprehensively supervise snapshotting and backup/restore as a virtual device, thereby significantly reducing the number of management steps. In the following, explanation is made with reference to preferred embodiments of the present invention.

FIG. 1 shows the configuration of a network file system, as a client-server remote file system, provided with a switch according to an embodiment of the present invention. Referring to FIG. 1, the network file system includes at least one client 1, at least one file server 3 and a switch 100, all connected to a network 2. The server 3, which includes a file system layer 4 composed by software for managing data, such as files, accessed by file access services, and a storage device 5 for storing data and files, is a file server providing file access services to each client. A backup unit 6 is connected to the network 2 to save backup data of the servers 3. In the present embodiment, the switch 100 is provided with the function of managing snapshot and backup/restore in the servers 3. As shown for example in FIG. 6, regarding the backup unit 6, a backup server 7 may be connected to the network 2 and to the file servers 3 so that backup will be carried out from the backup client (file server 3) via backup server 7 to tape drives 8.

As a basic technology for hiding the presence of the plural servers 3 from the client 1, the management of the correspondence relationship between the object ID and the server 3 in the switch 100 is first described. As for details, see e.g. the above indicated Patent Document 2. The switch 100 receives a file access request from the client 1 and distributes and transmits the request to appropriate ones of the file servers 3. On the other hand, the switch 100 receives a response for the file access request, transmitted from the file servers 3, to transfer the response to the associated client as the source of transfer of the file access request. The client 1 designates an ID for identification of objects, such as directories or files, being accessed, and accesses the object that are managed by the servers 3. The object ID is generated in the server 3 and the client 1 owns a list of the objects that the client is able to access. The client generates and transmits a request designating the access path to the object from the above list, and retrieves the object ID of the object, that may be accessed first, from the response data. As for the object, arranged in a lower rank relative to the object, the object ID of which has already been acquired by the client 1, the client 1 transmits a request, inclusive of the object ID, already retrieved, and the name of the object, as a target of the file access, and retrieves the object ID from the response to the request.

In the network file system of the present embodiment, the presence of the server 3 is hidden from the client by the switch 100. Thus, a request for file access from the client 1 is transmitted to the switch 100. On receipt of the file access request from the client 1, the switch 100 distributes and transfers (routes) the file access request to an appropriate server 3. The switch 100 receives a response to the file access request, transmitted from the server 3, and transmits (routes) the response to the client 1 which transmitted the file access request. The object ID, generated in the server 3, is made up by a data string that can be interpreted only by the server 3 which produced it, so that neither the client 1 nor the switch 100 is able to interpret the object ID data. Moreover, the client 1 is unable to manipulate the object, matched to the object ID, except if the client 1 has received the response from the server 3 and has obtained the object ID contained in the response. Thus, in the present embodiment, the switch 100 inserts server identification information for identifying the server, as the source of transfer, from the other server(s), into the object ID, included in the response data transmitted from the server 3, reconstructs a packet, by a response, including the object ID, in turn including the so inserted server identification information, and re-transmits the so reconstructed packet to the client. The client 1 transmits the file access request which includes the object ID into which has been inserted the server identification information, to the switch 100. The switch 100 receives the file access request transmitted from the client and refers to the server identification information, inserted in the object ID thereof, to specify the server to which the file access request is to be transmitted. Meanwhile, when transmitting the file access request to the server 3, the switch 100 converts the object ID, into which has been introduced the server identification information, to the original object ID generated by the server 3. With the switch 100, having the function above mentioned, it is possible to achieve distributed processing by plural servers in the network file system.

Figure 2:
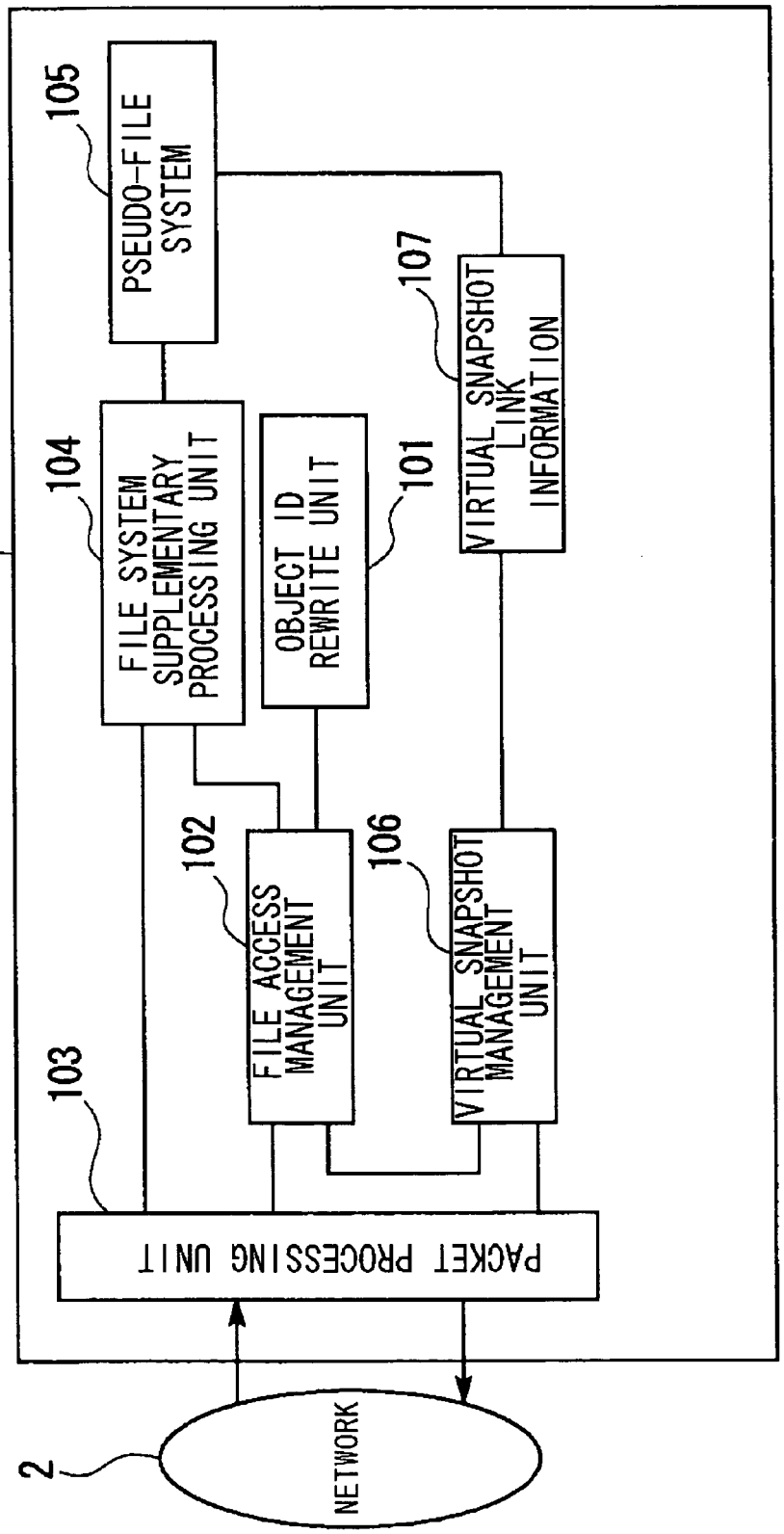
FIG. 2 is a diagram showing configuration of a switch of an embodiment of the present invention.

FIG. 2 illustrates an example of the configuration of the switch 100 according to the present embodiment. Referring to FIG. 2, the switch 100 according to the present embodiment includes an object ID rewrite unit 101 for rewriting the object ID, as described above, a file access management unit 102, a packet processing unit 103, a file system supplementary processing unit 104, a pseudo-file system (PFS) 105, a virtual snapshot management unit 106 and the virtual snapshot link information 107.

The packet processing unit 103 analyzes a packet, received over the network 2 from the client 1 and the servers 3, extracts data contained in the packet and outputs the data to the file access management unit 102. The packet processing unit 103 packetizes the data output from the file access management unit 102, and transmits the so packetized data over the network 2 to the client 1 and to the servers 3.

The file access management unit 102 is supplied with and analyzes data, output from the packet processing unit 103, and determines the transfer destination of the packet 103 received by the packet processing unit 103.

The object ID rewrite unit 101 rewrites the object ID, contained in the above data, depending on the transfer destination of the packet as determined by the file access management unit 102.

The pseudo-file system 105 is a system for combining plural directory trees, made up by respective file systems of the plural servers 3, shown in FIG. 1, and for managing the directory trees, thus combined together, as a consolidated directory tree.

The file system supplementary processing unit 104 executes supplementary processing in a case where a file access request from the client 1 necessitates file access across a plurality of transmission destinations such as the plurality of servers 3 or plurality of file system layers 4.

The virtual snapshot management unit 106 issues a snapshot command to the server 3. The virtual snapshot management unit 106 also exercises control for setting a link across the plural snapshots in correspondence with the file system structure of the pseudo-file system (PFS) 105 at the time of generating snapshots. Meanwhile, in the present embodiment, it is each server 3 that takes charge of snapshot, backup and restore processing operations.

The virtual snapshot management unit 106 sets up the link across the plural snapshots generated by the plural servers 3, so that these snapshots will be in correspondence with the consolidated directory tree of the pseudo-file system 105. The virtual snapshot link information 107 saves and holds the link information across the snapshots (pointer information at a junction to the connection destination). Although the pseudo-file system 105 of the switch 100 is changed with changes in the data in the servers 3, the virtual snapshot link information 107 is a fixed image of the virtual snapshots at the time the snapshots were prepared. Thus, the pseudo-file system 105 at the time of the preparation of the snapshots may be restored based on the virtual snapshot link information 107.

In the present embodiment, the switch 100, configured to hold and manage the information at junctions of the directly tree of the respective servers 3, in the pseudo-file system 105, is also configured to hold and manage the information at the junctions of the snapshots of the respective servers 3. The virtual snapshot link information 107 is supervised in dependence upon the snapshot generation. That is, virtual snapshot link information 107 for a predetermined number of generations is saved and retained.

The switch 100 includes, in addition to the function of appropriately distributing the file access request packets and file access response packets to the client 1 or to the servers 3, the function of consolidating the directory trees, formed in the file systems 4 of the plural servers 3, to a single directory tree of the pseudo-file system 105. With this function of the switch 100, the client 1 can access any file in the plural servers 3, in a manner as if the client is accessing only the pseudo-file system 105 of the switch 100, without the client becoming conscious of the presence of the individual file systems 4 in the plural servers 3.

The pseudo-file system 105 combines the tree structures of the plural directory trees on the file systems 4, laid open by the servers 3 as being accessible over the network 2, for mapping the tree structures to a single directory tree. In the present embodiment, the processing and functions of the object ID rewrite unit 101, file access management unit 102, packet processing unit 103, file system supplementary processing unit 104 and the virtual snapshot management unit 106 of the switch 100, shown in FIG. 2, may be implemented by a computer program executing on a computer constituting the switch 100.

Figure 3:
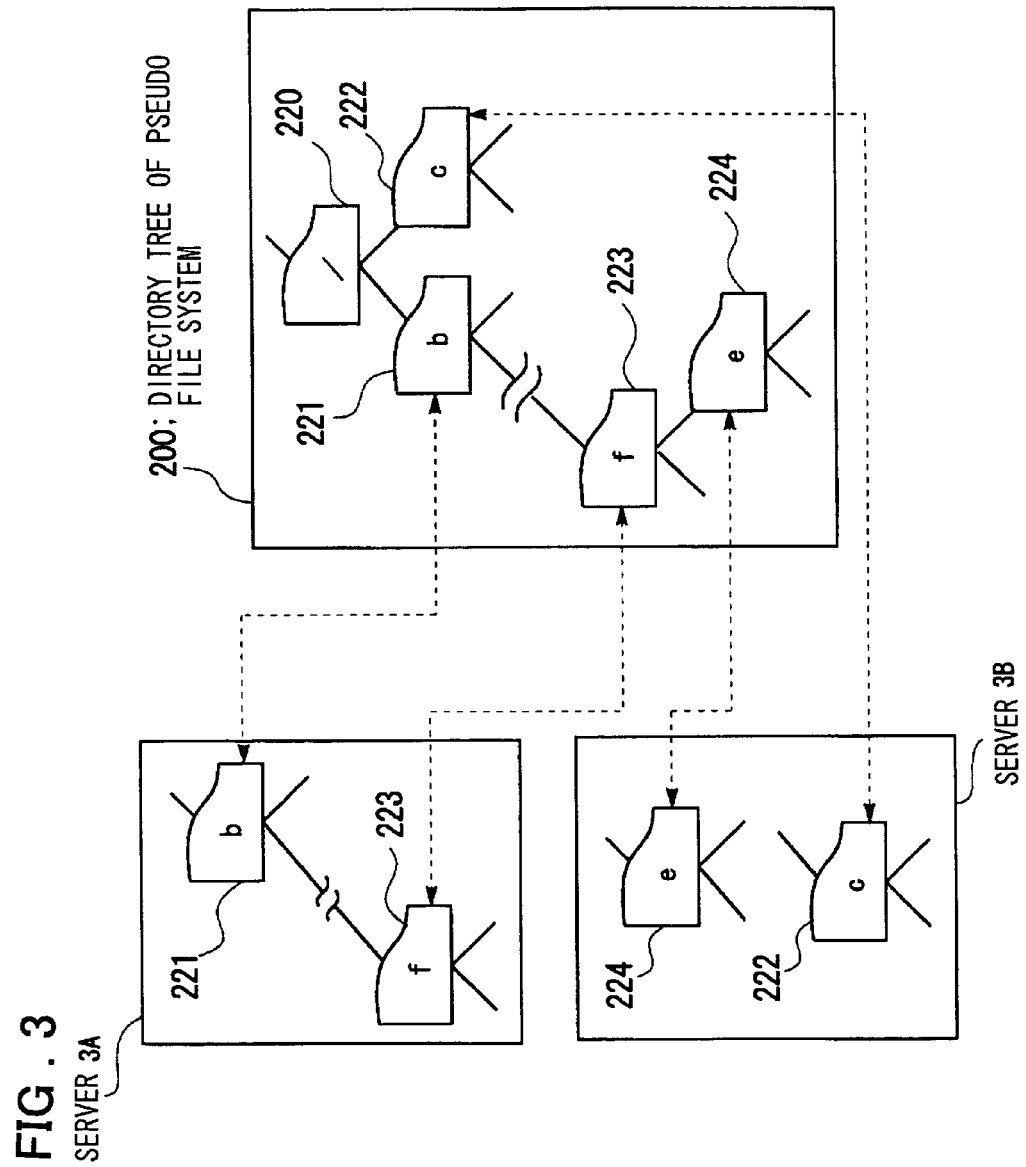
FIG. 3 illustrates a unified directory tree in an embodiment of the present invention.

FIG. 3 shows an example of a directory tree 200 of the pseudo-file system 105 of FIG. 2. Referring to FIG. 3, the pseudo-file system 105 maps tree structures of directory trees of a directory b(221), laid open by a server 3A, and a directory c(222), laid open by a server 3B, to a directory tree of subdirectories from a root directory 220(/) formed on the pseudo-file system 105. The root directory 220(/) of the directory tree 220 formed on the pseudo-file system 105 includes pointers to the directories 221 and 222. The pseudo-file system 105 creates the directory tree 200 of the pseudo-file system by registering the tree structure of the directory tree of the directory e(224), laid open in the server B, as a directory tree of subdirectories of a directory f(223) lying in a lower layer of the directory tree of the directory b (221). With the switch device according to the present embodiment, the names of the directories on the directory tree 200 of the pseudo-file system need not necessarily be the same as the directory names as set in the file systems 4 of the servers 3, such that these directories may be renamed and these different names may be laid open to the client.

In the switch 100, the pseudo-file system 105 manages only the tree structure of the directory tree 200 of the pseudo-file system, such that, for example, the object data, attribute information or the tree structure of each file system, other than the junctions thereof, are all supervised by the server 3. For example, the pseudo-file system retains and supervises the tree information of the directory tree 200 of the pseudo-file system of FIG. 3, such as the information on the node junction points of the root directory 220(/). Only the tree information of the junctions in the directory tree 200 of the pseudo file system at the time of the snapshot generated is stored and supervised as the virtual snapshot link information 107 of FIG. 2, while each tree structure other than the junctions is stored as the snapshot of the server 3. This configuration represents an essential feature of the present invention.

The switch 100 takes charge only of name resolution processing for tree portions interconnecting the file systems 4, while the server 3 takes charge of processing for other tree portions, that is, tree portions other than junctions.

Figure 4:
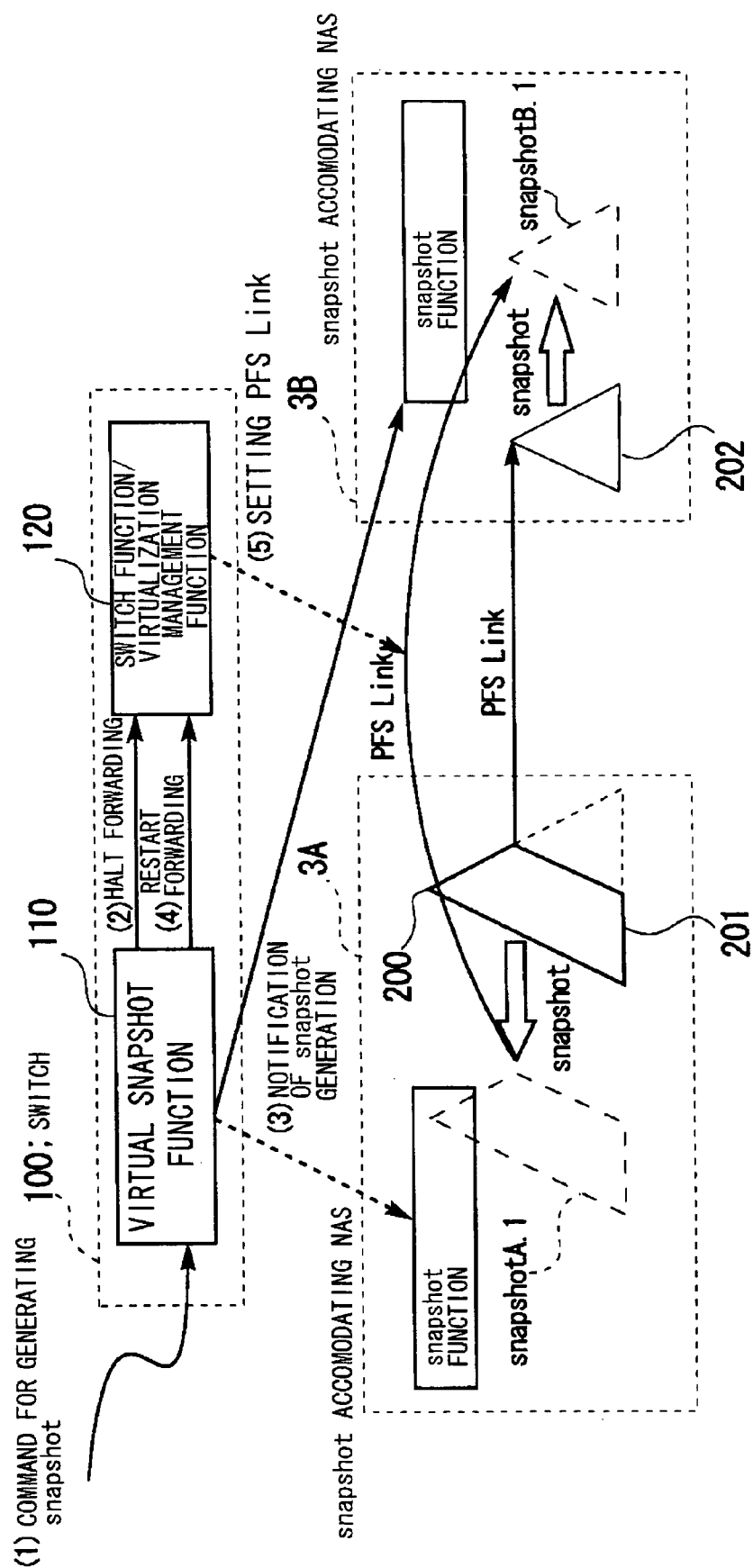
FIG. 4 illustrates generation of a snapshot in an embodiment of the present invention.

A concrete example of the operation of the present embodiment will now be described. FIG. 4 schematically shows the operation of an embodiment of the present invention. In FIG. 4, a virtual snapshot function 110 corresponds to the virtual snapshot management unit 106 of FIG. 2, whilst a switch function/virtualization management function 120 comprises the packet processing unit 103, file access management unit 102, file system supplementary processing unit 104, pseudo-file system 105 and the virtual snapshot link information 107 of FIG. 2. In the following, the server is assumed to be a NAS device, only by way of an example.

The switch 100 receives a command for generating a snapshot (step 1). In the present embodiment, a command for generating a snapshot is issued by log-in at the switch 100 or over the network. Or, a command for generating the snapshot may periodically be issued by the switch 100.

The virtual snapshot function 110 commands the switch function/virtualization management function 120 to halt forwarding to prohibit updating of the file system being snapped (step 2). For finding a complete point of quiescence of the file system being snapped, it is confirmed at this time that a response from the server 3 to the request (Call) from the client 1 has been returned (checking for synchronization). If synchronization is not achieved, the command for starting the generation of a snapshot to the server 3 is set in the waiting state. This synchronization management is carried out by cooperation between the file access management unit 102 and the packet processing unit 103 of FIG. 2.

The virtual snapshot function 110 notifies the servers 3A and 3B accommodating the snapshot function (NAS servers) of the start of generation of the snapshot (step 3).

On receipt of the completion of the formation of the snapshot by the server 3, the virtual snapshot function 110 commences the forwarding to the switch function/virtualization management function 120.

After generating the snapshot in the servers 3A and 3B, a link for the pseudo-file system 105 (PFS link) is created in the pseudo-file system 105 in the switch 100 (step 105). For example, if the directory tree 200 of the pseudo file system is as shown at 200 in FIG. 4 (or 200 in FIG. 3), that is, if the directory tree 200 is unified from the directory tree 201 of the file system of the server 3A and the directory tree 202 of the file system of the server 3B, the servers 3A and 3B on receipt of the notification of the start of the formation of the snapshot generate an image of the directory tree 201 as 'snapshot A.1' and an image of the directory tree 202 as 'snapshotB.1', respectively, where 'snapshot A' denotes an alias name for snapshot access, as set on the system, and '1' denotes the generation number. It is noted that the alias names 'snapshot A' and 'snapshot B' are simply for matching to the servers 3A, 3B, such that the alias names of the snapshots, as set by the servers' snapshot software, may be the same for the different servers.

In the directory tree 200 of the pseudo-file system 105 of the switch 100, the directory tree 201 of the real file system (server 3A) is linked (by PFS link) to the directory tree 202 of the real file system (server 3B). In similar manner, the snapshot 'snapshot A.1' of the directory tree 201, generated by the server 3A, is linked by an equivalent link (PFS link) to the snapshot 'snapshot B.1' of the directory tree 201, generated by the server 3B. Specifically, the pointer information, pointing to the objects of the link destination, is held at the junction between the two snapshots 'snapshot A.1' and 'snapshot B.1'. This linkage information is stored and managed by the switch 100, as the virtual snapshot link information 107, in accordance with the snapshot generation.

In this manner, the plural snapshots, discretely generated in the respective servers 3 of FIG. 1, may automatically be mapped to a consolidated directory tree effective at the time of the formation of the plural snapshots.

Figure 5:
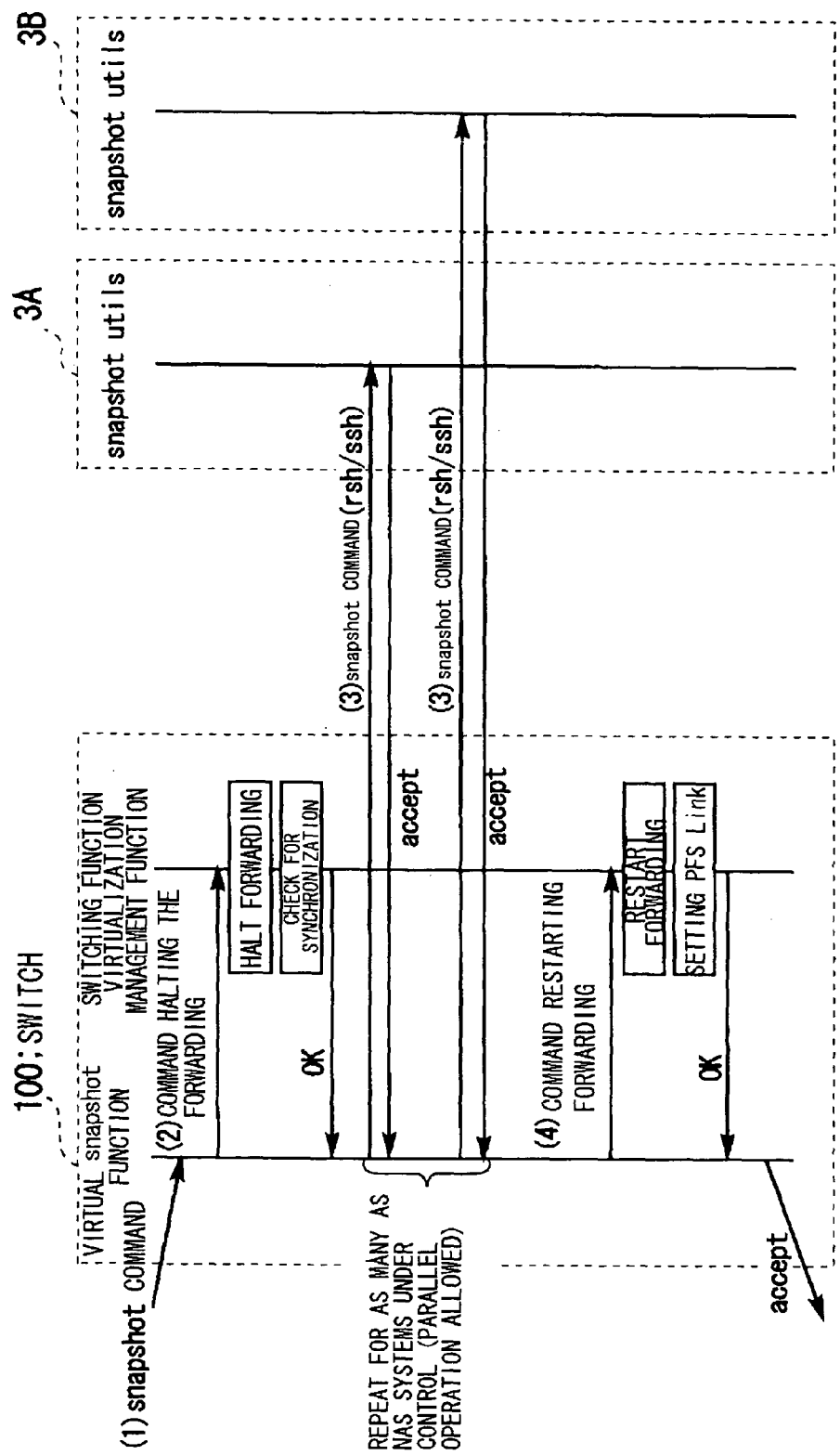
FIG. 5 illustrates the sequence of generation of a snapshot in an embodiment of the present invention.

FIG. 5 illustrates a processing sequence of the present invention, shown in FIG. 4. The servers are NAS servers. The switch 100 receives a command for generating a snapshot (step 1).

The virtual snapshot function 110 commands the switch function/virtualization management function 120 to halt forwarding to inhibit the updating of the file system structure of the servers 3A, 3B. The switch function/virtualization management function 120 halts the forwarding and verifies the synchronization. For example, the switch function/virtualization management function verifies that no response to a call from the client has been returned from the servers 3A and 3B.

The virtual snapshot function 110 of the switch 100 sends notification of snapshot generation to the snapshot accommodating servers (NAS servers) 3A and 3B under its control (step 3). This notification is carried out by the switch 100 executing the snap shot command by the server 3 by a rsh (remote shell) or ssh (secure shell). Meanwhile, the virtual snapshot function 110 may transmit snap shot commands in a parallel fashion to a larger number of snapshot accommodating servers.

The switch 100 may assign the name of the same generation for the snapshot generation of the servers 3A and 3B. In this case, the generation name may be attached to the notification of the snapshot generation from the switch 100.

The virtual snapshot function 110 commands the switch function/virtualization management function 120 to restart the forwarding (step 4).

The switch function/virtualization management function 120 creates a link across the plural snapshots in correspondence with the pseudo-file system 105. After creating the link, the switch function/virtualization management function 120 transmits the response to the virtual snapshot function 110, which virtual snapshot function 110 then transmits an accept response (accept) to a terminal.

Figure 6:
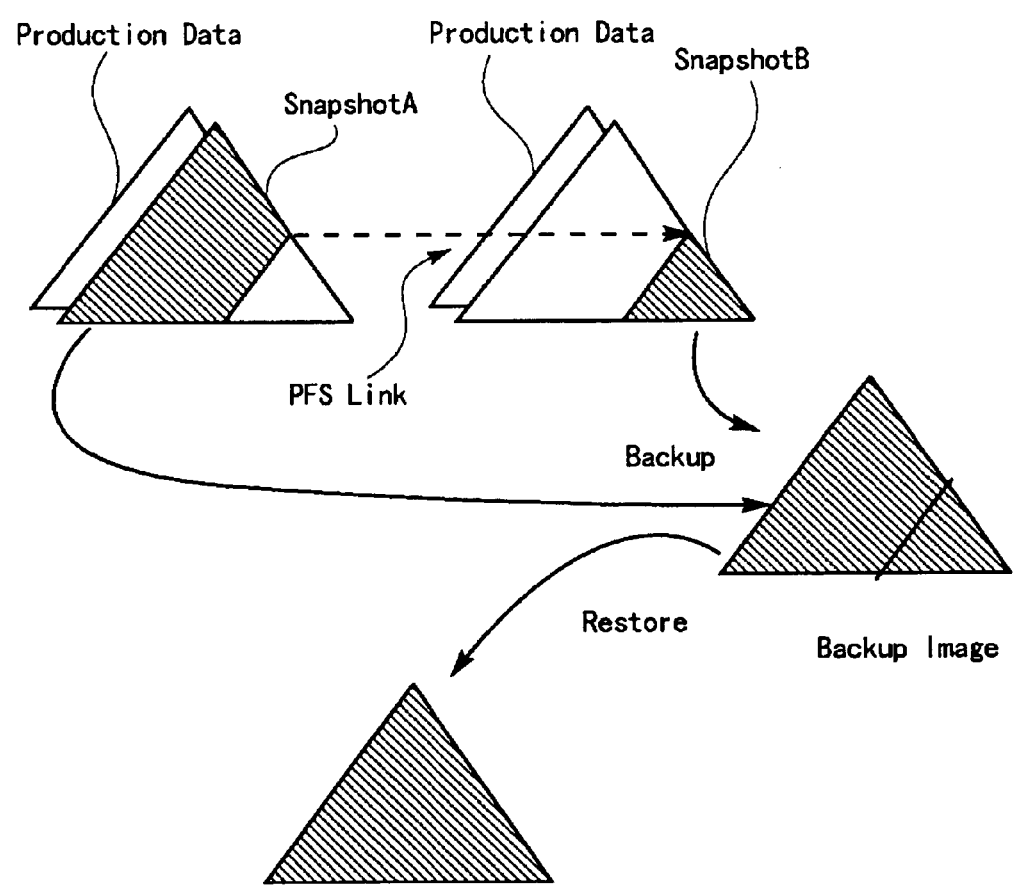
FIG. 6 illustrates backup/restore in an embodiment of the present invention.

FIG. 6 illustrates the backup/restore operation with a pseudo file system image according to an embodiment of the present invention. The snapshots (snapshot A and snapshot B) of two file systems are combined by a link (PFS link). In this state, an image which is the same as each snapshot is read out from each of the two file systems and backed up under control by the switch of FIG. 1. Thus, a backup image of a single virtual file system associated with plural file systems, is saved in e.g. a tape. Meanwhile, in FIG. 6, 'Production Data' schematically represents real data modified as from the time of generation of the snapshots (snapshot A and snapshot B).

The backup employing the snapshot will now be described. Since snapshot data are the same as data of the snapped file system, a backup command, such as cpio, operating based on a standard file system structure, may be used. With the backup command for reading a raw disk image, such as fscat, a raw image of the file system, which is the same as that obtained when the backup command of the disk image is used for the disk which has stored the file system snapped at the time of the generation of the snapshot, is obtained. If a system call which supports reading of the snapshot is used, the same result as that obtained on reading the disk which stored the snapped file system when the snapshot was generated may be obtained (see e.g. the above indicated Non-Patent Document 1).

When the backup image, saved on a tape, is restored in a single file system, the one virtual file system for the time point of formation of the snapshot, may directly be restored.

The processing of FIG. 6 may also be carried out by the client 1 of FIG. 1 being mounted to the server 3 via switch 100, in accordance with the NFS protocol, reading out the snapshot and backing up the snapshot in the backup unit 6.

Figure 7:
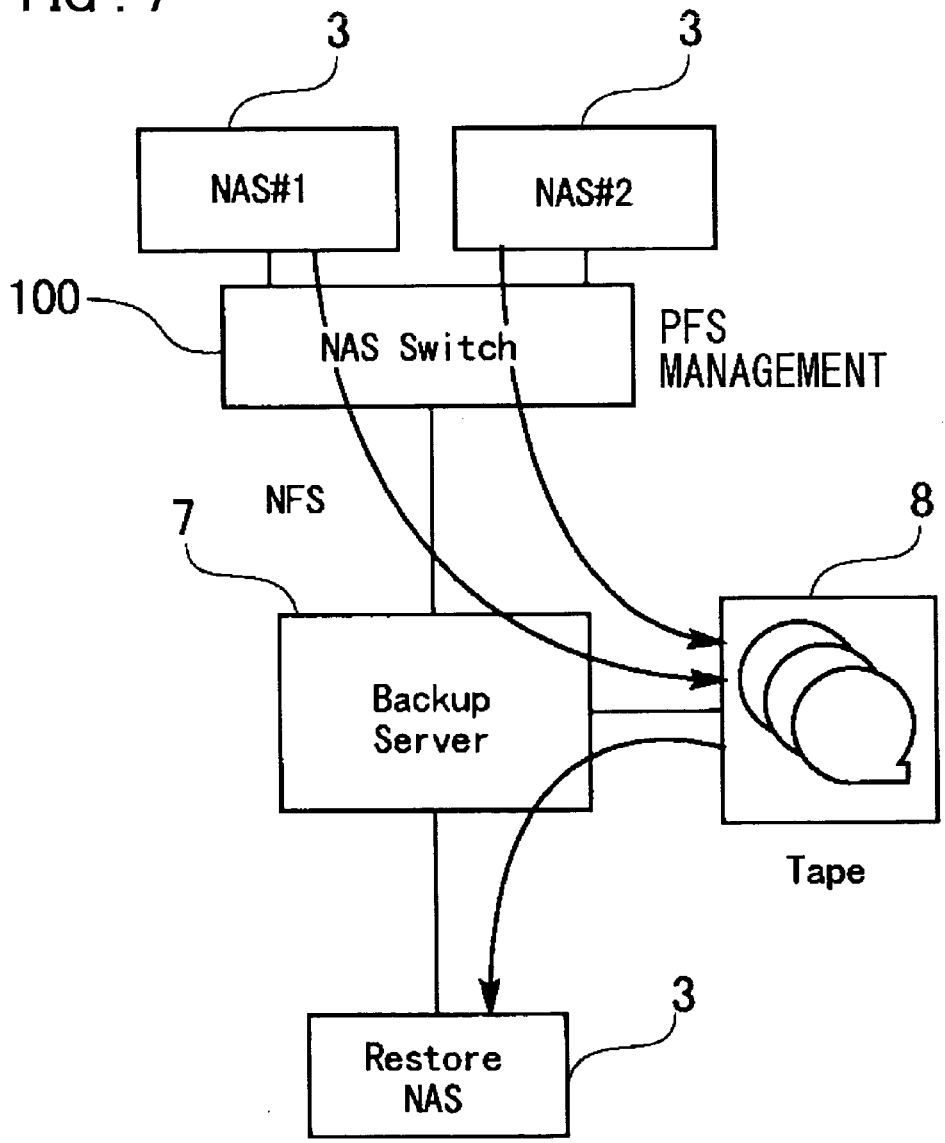
FIG. 7 illustrates a processing sequence for backup/restore in an embodiment of the present invention.

FIG. 7 illustrates the case of carrying out the operation of FIG. 6 using a backup server. A snapshot is taken by each of the two file servers 3 (NAS#1, NAS#2), and the switch 100, termed a NAS switch, sets a link across plural snapshots of the two file servers 3 (NAS#1, NAS#2). The respective file systems of the two file servers 3 (NAS#1, NAS#2) are backed up on the tape drives 8, via switch 100 and backup server 7, to the same image as the virtualized snapshot. This backs up a backup image (i.e. a backup image of a virtual file system) of the plural file systems, turned into a single virtual file system. This configuration also represents one of the principal features of the present invention.

In restoring, the backup image is restored from the tapes 8 to a single file server 3 (NAS device), by the backup server 7, without the intermediary of the switch 100. The file server 3 is able to restore the virtual file system as of the snap time point.

In the present embodiment, the backup server and the file server may be connected with a protocol other than the NFS protocol to effectuate high-speed transfer. The storage device for backup is not limited to a tape. Of course, the storage device for backup is not limited to a tape drive and may be any of other suitable recording devices.

FIG. 8 shows an example of the configuration of a system including the backup server 7 shown in FIG. 7. The backup server 7 and the server 3 (backup client) may also be connected by an interface other than the NFS protocol (e.g. SCSI). The backup server 7 and the switch 100 may also be connected by an interface other than the NFS protocol. There may also be provided an interface 71 for controlling the direct communication connection across the backup server 7 and the switch 100.

Figure 9:
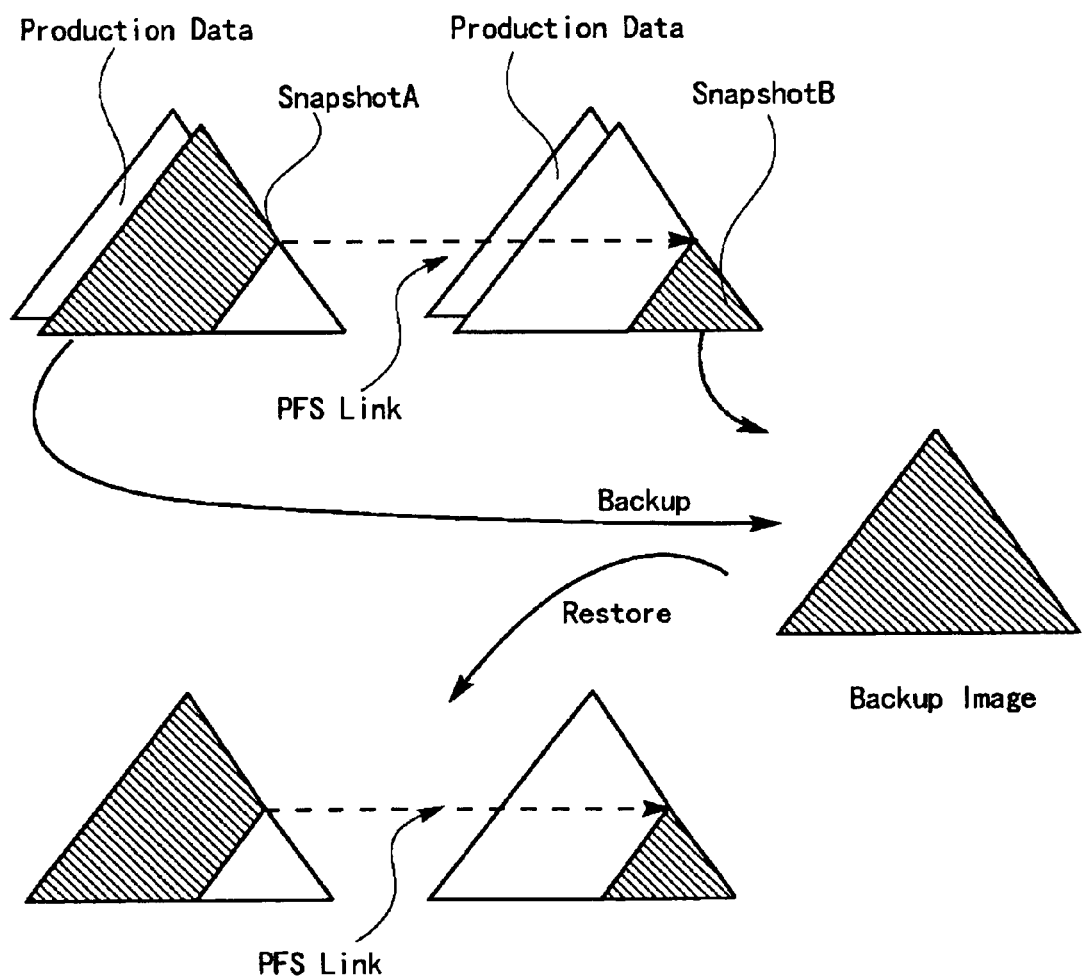
FIG. 9 illustrates backup/restore in another embodiment of the present invention.

FIG. 9 illustrates the operation for backup/restore to the image of the pseudo file system for another embodiment of the present invention. A link (PFS link) is set across the snapshots of the two file systems (snapshotA, snapshotB), in keeping with the directory tree of the pseudo file system. In this state, the backup of the two file systems is taken, using virtualized snapshots. A backup image of the directory tree of the pseudo file system at the time point of the generation of the snapshots is stored e.g. in a tape. Meanwhile, the "production data" in FIG. 9 schematically shows the real data changed as from the time point of the generation of the snapshots.

The switch 100 distributes the backup image, stored on the tape, to restore destinations, based on the pseudo-file system information of the switch 100 (virtual snapshot link information 107 of FIG. 2), to restore the image to the two file systems, for restoration of the file system at the time point of snapshot generation, in the respective file systems. By the restored two file systems, the virtual file system at the time of snapshot generation may be restored.

Figure 10:
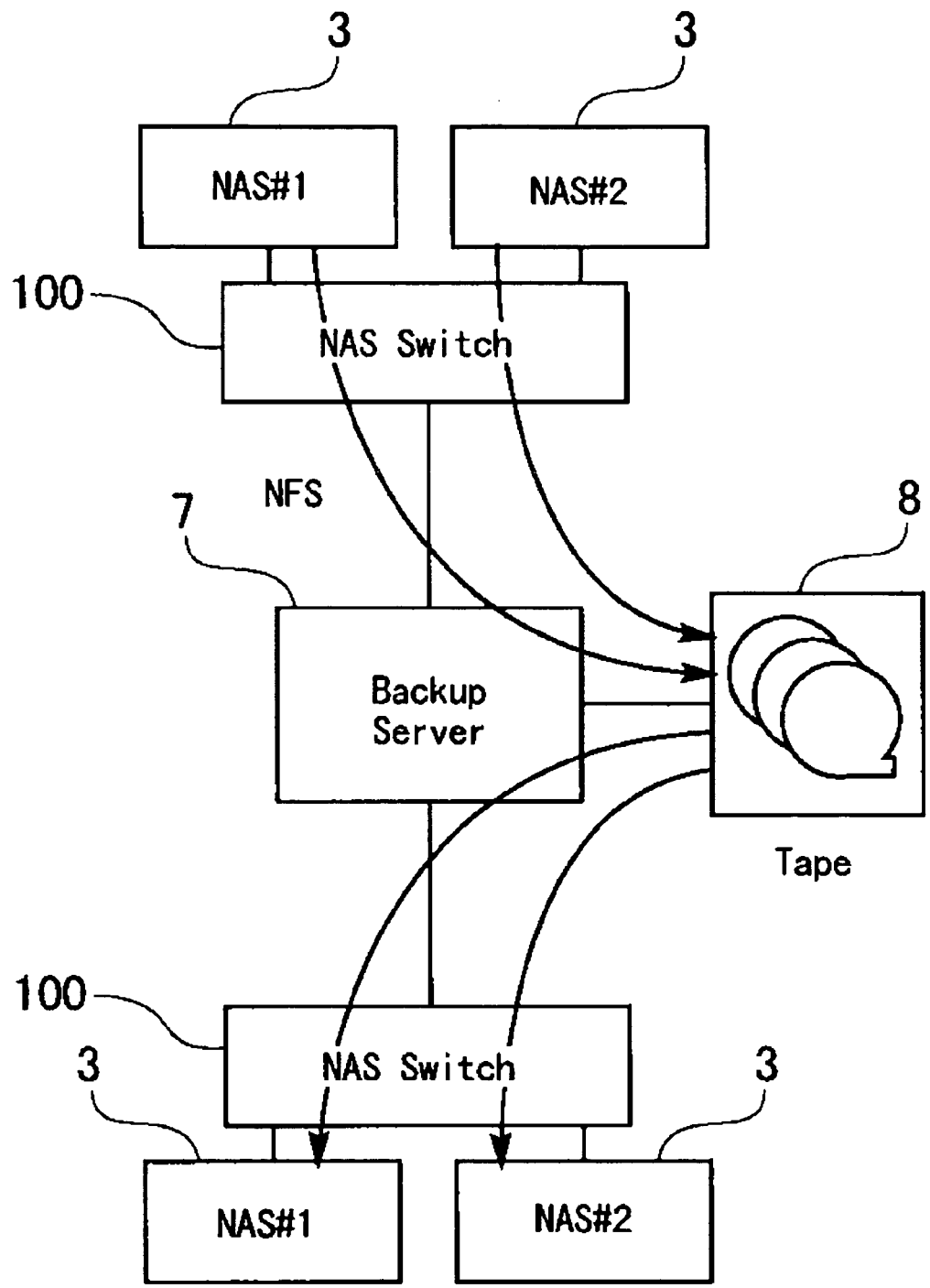
FIG. 10 illustrates a processing sequence for backup/restore in another embodiment of the present invention.

FIG. 10 schematically shows a case where the file server (backup client), switch and the backup server execute the processing, shown in FIG. 9, using the NFS protocol. The two file servers 3 (NAS#1 and NAS#2) take snapshots and the switch 100 (NAS switch) sets a link across the plural snapshots, in correspondence with the directory tree of the pseudo file system, to generate a virtualized snapshot. The backup server 7 is mounted via switch 100 to the file servers 3 to take a backup using the snapshots. At this time, the data read out from the two file servers 3 (NAS#1, NAS#2) are backed up in the tape drives 8, in accordance with the snapshots turned into the virtual entities by the switch (NAS switch 100), for taking a backup of the file system corresponding to the file system structure of the pseudo file system.

In restoring, backup data are distributed from the backup server 7 via switch 100 to plural file servers (NAS devices). The restore data (objects) are distributed, at the time of restoring, to the servers 3 by the switch 100, as it is verified, based on the virtual snapshot link information 107, in the configuration shown in FIG. 2, to which server relates the restore data. As for the backup data, increments (delta) as from the time of snapshot generation may be backed up. In this case, the file system, added by the increments as from the time point of the snapshot generation, is restored in the two servers.

Figure 11:
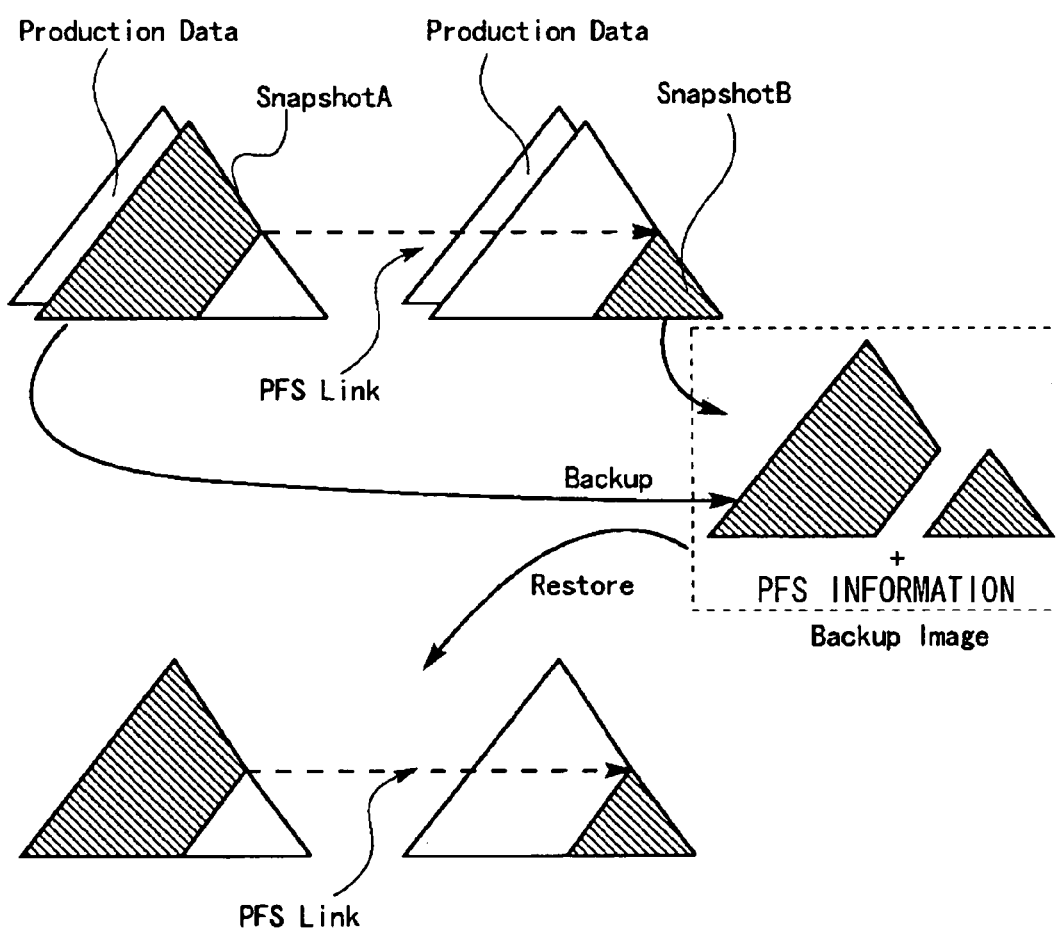
FIG. 11 illustrates backup/restore in another embodiment of the present invention.

FIG. 11 illustrates backup/restore processing in case the file server (backup client) and the backup server communicate with each other using a protocol other than the NFS protocol. There is a link (PFS link) formed across the snapshots of the two file systems (snapshot A and snapshot B), in keeping with the directory tree of the pseudo file system at the time of snapshot generation. In this state, each of the two file systems is backed up and furthermore the information of the pseudo-file system 105 at the time of snapshot generation (directory tree information) is stored e.g. in the tape.

By restoring the backup image of the two file systems of the tapes 8, and by saving the pseudo-file system information at the time of snapshot generation in the switch 100, the virtual file system at the time of snapshot generation, when viewed from the client 1, may be restored via switch 100.

Figure 12:
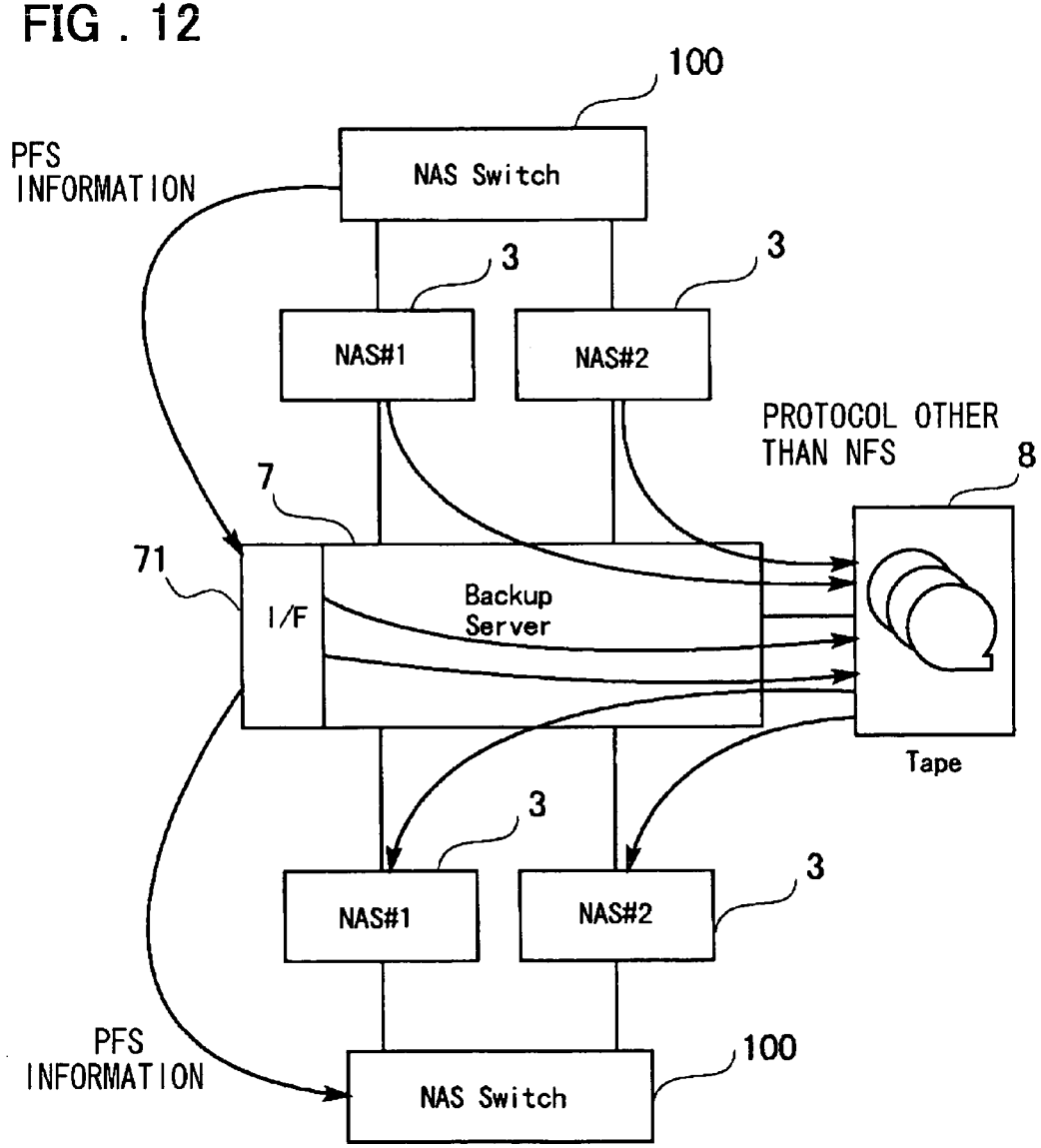
FIG. 12 illustrates a processing sequence of for backup/restore in a further embodiment of the present invention.
Figure 13A:
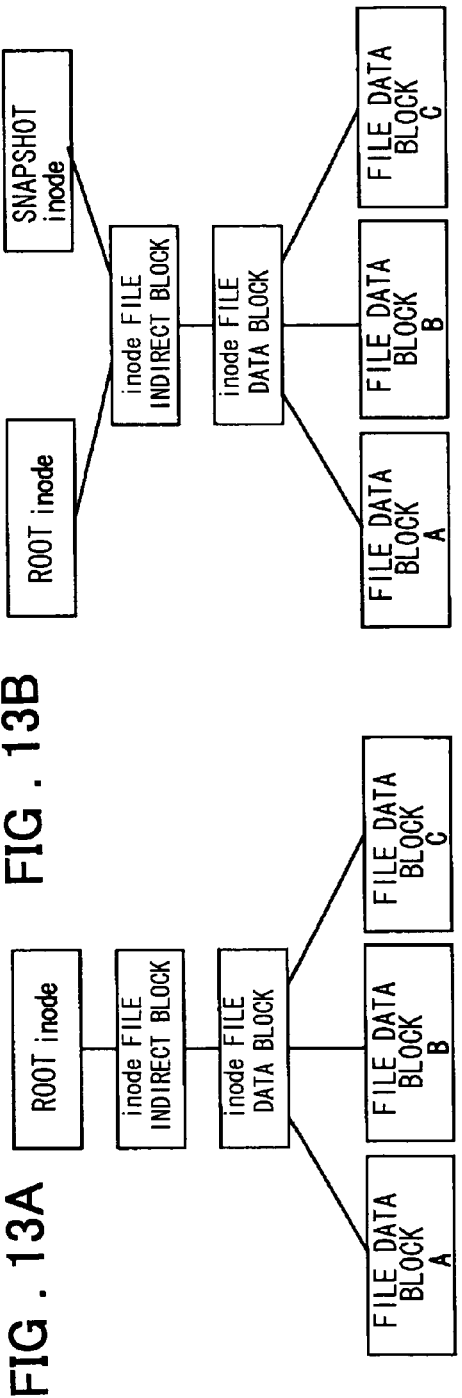
FIGS. 13A, 13B and 13C illustrate snapshot.
Figure 13B:
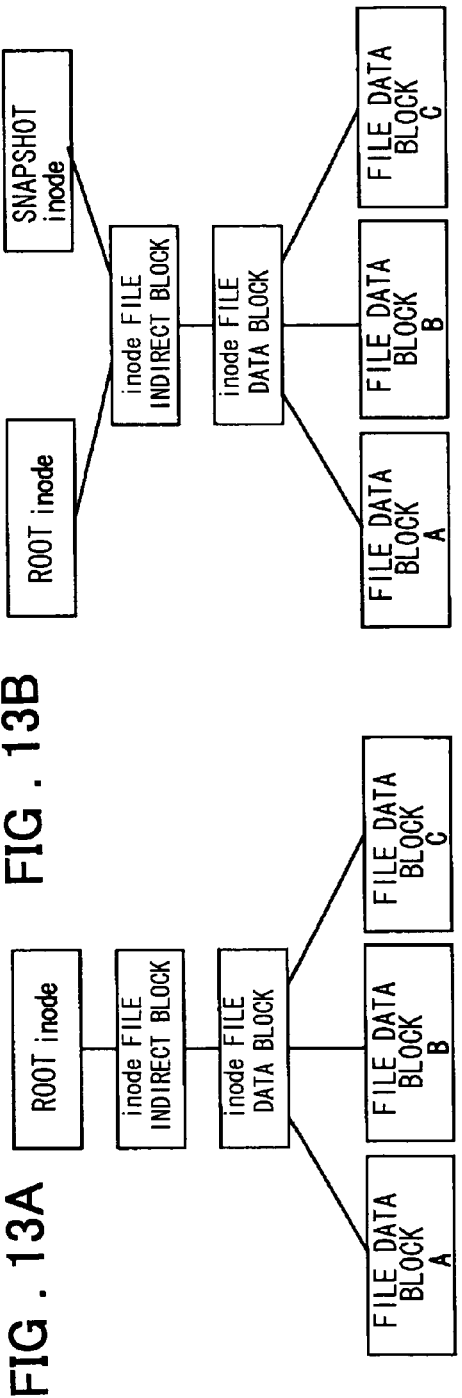
Figure 13C:
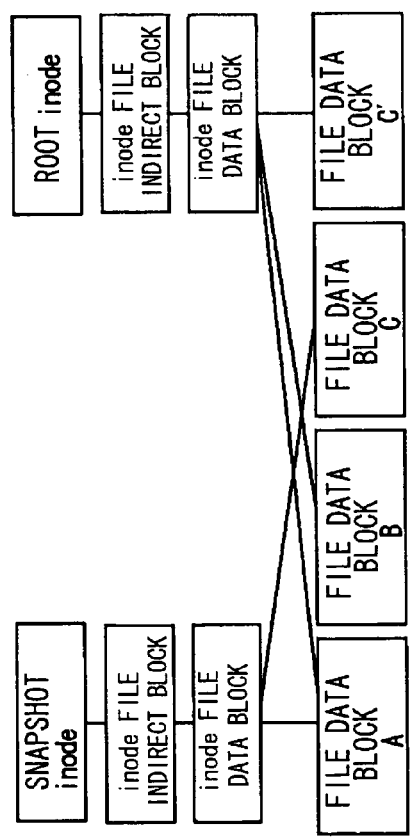
Figure 14:
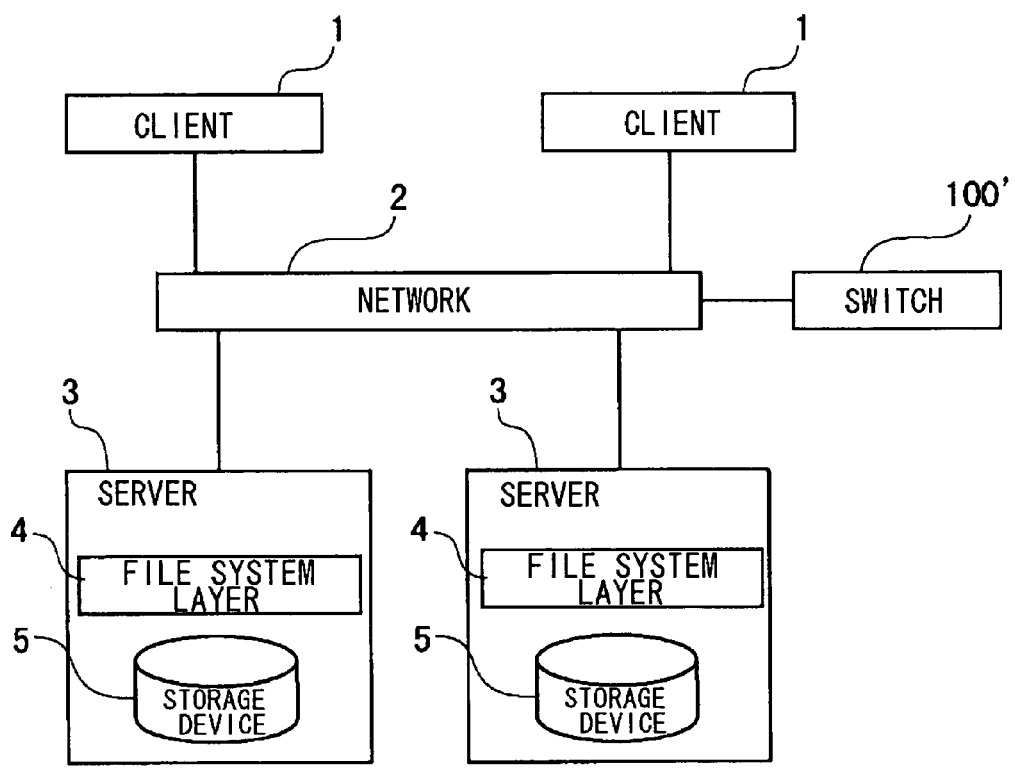
FIG. 14 illustrates a conventional system configuration.

FIG. 12 schematically shows the case where the file server (backup client) and the backup server perform the processing shown in FIG. 11 using a protocol other than the NFS protocol. The two file servers 3 (NAS#1, NAS#2) take snapshots, whilst the switch 100 sets a link (PFS link) of the two snapshots.

From the two file servers 3 (NAS#1, NAS#2), data are directly transmitted to the backup server 7, by e.g. SCSI, without the intermediary of the switch 100, so as to be backed up e.g. in the tapes 8. The backup server 7 may carry out the full backup of the storage device to the tape 8.

From the switch 100, the pseudo file system information (PFS information), for example, the virtual snapshot link information 107 of FIG. 2, is transmitted to the backup server 7 via e.g. an interface 71 so as to be stored on e.g. the tapes 8.

In restoration, the backup images from the tapes 8 are restored from the backup server 7, without the intermediary of the switch 100, to the two file servers 3 (NAS devices).

The pseudo file system information (PFS information), backed up e.g. on the tapes 8, is transmitted from the backup server 7 via e.g. the interface 71 to the switch 100, for restoration.

A virtual file system, at the time of the snapshot restoration, viewed via switch 100 from the client, may be restored. When a file access request is made from the client, the server identification information is inserted into the object ID. Based on this server identification information, the switch 100 transmits the file access request to the destination server 3. As at the time before backup/restore, the client is able to access the object of the virtual file system at the time of the snapshot generation.

The backup/restore command in the server may be transferred from the client via switch to the server. Requests may be made by the file server as the backup client, and, responsive to the requests, the backup server may be connected to the file system of the file server to take a backup. It may also be the data management application (DMA) that issues a command in accordance with the NDMP.

Thus, in the present embodiment, an administrator does not have to map the plural file systems to the virtual file system, by taking a backup image of a single virtual file system, virtually prepared from the plural file systems, using the virtualized snapshots, with the result that the maintenance and management may be facilitated appreciably. That is, safety of data and system reliability may be assured as the load in the maintenance and management is relieved.

Although the above-described embodiments are based on the NAS, the present invention is not limited to the NAS and may be applied to optional file servers attached to the Internet. Although the present invention has so far been described with reference to certain preferred embodiments, the present invention is not limited to the configuration of these embodiments and may encompass various changes or corrections that may readily occur to those skilled in the art within the scope of the invention as defined in the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A backup management system comprising:
a plurality of file servers, each of the file servers include a file system; and
a switch arranged logically between a user terminal and said plurality of said file servers,
said switch including:
connecting a plurality of file systems of said plurality of said file servers into a single directory tree to construct a pseudo file system, a file access to each of said plurality of file systems of said plurality of said file servers by said user terminal being performed through said switch, said plurality of said file systems constructing said pseudo file system being accessed as a single file system by said user terminal through said switch;
commanding said plurality of file servers to start generation of snapshots, which are fixed images of said file systems at a certain point in time,
said plurality of file servers generating respective snapshots responsive to a command that starts said generation of said snapshots; and
making a connection across said plurality of said snapshots to generate a virtual snapshot, in which said plurality of said snapshots generated by said plurality of file servers are arranged to have a directory tree structure corresponding to said directory tree of said pseudo file system at a time of said generation of said snapshots and for recording and managing tree information at a junction of each pair of said connected snapshots,
each of said plurality of said file servers recording and managing, as snapshot information in said file server, directory tree structure information other than said tree information at said junction of each pair of said connected snapshots,
wherein at least one of backup and restore is made using said virtual snapshot,
wherein said commanding said plurality of file servers to start generation of snapshots performs name resolution processing for a tree node at said junction of each pair of said connected snapshots, and said plurality of file servers performs name resolution processing of tree nodes of said directory tree other than said junction of each pair of said connected snapshots, and
wherein said junction of each pair of said connected snapshots is a data structure, and comprises pointer information pointing to said connected snapshots.

2. A file access service system comprising:
at least one terminal;
a plurality of file servers, each of the file servers include a file system; and
an intermediate device logically arranged between said at least one terminal and said plurality of file servers, said intermediate device making a connection across a plurality of file systems into a single directory tree to construct a pseudo file system, said plurality of said file systems being accessed as a single file system by said one terminal through said intermediate device;
said intermediate device including commanding each of said plurality of file devices to start generation of a snapshot which is a fixed image at a specific point in time of said file system of each of said plurality of file servers;
each of said plurality of file servers generating said snapshot responsive to a command from said intermediate device that starts to generate said snapshot;

said intermediate device also including making a connection across said plurality of said snapshots to generate a virtual snapshot, in which said plurality of said snapshots generated respectively by said plurality of file devices are arranged to have a directory tree structure corresponding to said single directory tree of said pseudo file system at a time of said generation of said snapshots, and for recording and managing tree information at a junction of each pair of said connected snapshots in said directory tree structure, each of said plurality of said file servers recording and managing, as snapshot information in said file server, directory tree structure information other than said tree information at said junction of each pair of said connected snapshots, wherein said intermediate device performs name resolution processing for a tree node at a junction of each pair of said connected snapshots, and said plurality of file devices performs name resolution processing of tree nodes of said directory tree other than said junction of each pair of said connected snapshots, wherein the junction of each pair of said connected snapshots is a data structure, and comprises pointer information pointing to said connected snapshots.

3. The file access service system according to claim 2, wherein
said intermediate device holds, as snapshot information relating to said pseudo file system, link information of junctions which connects said snapshots.

4. The file access service system according to claim 2, wherein
said at least one terminal reads said snapshots generated by said plurality of file devices from said plurality of file servers and takes a backup of a backup image corresponding to said snapshots in a recording device for backup.

5. The file access service system according to claim 2, further comprising
a backup control device;
said backup control device receiving, in taking a backup, said file systems of said plurality of file servers, via said intermediate device, to take a backup in a recording backup device as a single file system structure virtualizing said plurality of said file systems.

6. The file access service system according to claim 2, further comprising
a backup control device communicating with said plurality of file servers;
said backup control device in taking a backup, receiving said plurality of said file systems of said plurality of file servers via said intermediate device and taking said backup of said plurality of said file systems in a recording backup device as a single virtual file system structure of said plurality of said file systems.

7. The file access service system according to claim 6, wherein
said backup control device in restoration, sends backup data of said recording backup device to said intermediate device;
said intermediate device distributing said backup data, received from said backup control device, to a plurality of said file servers for restoration, in keeping with said pseudo file system information configured for allowing a plurality of said file systems to look as said single file system.

8. The file access service system according to claim 2, further comprising a backup control device that communicates with a plurality of said file servers;
said backup control device having an interface that communicates with said intermediate device;
said backup control device in taking a backup receiving said plurality of said snapshots of said plurality of file servers via said intermediate device; a link being set across said plurality of said snapshots; said plurality of said snapshots, said link is set to, being backed up in a recording backup device.

9. The file access service system according to claim 8, wherein
said backup control device, in restoration, sends said backup data of said recording backup device to said intermediate device;
said intermediate device distributing and transmitting said plurality of said snapshots to said plurality of file servers;
said plurality of file servers restoring said file systems using said plurality of said snapshots transmitted thereto.

10. The file access service system according to claim 2, wherein said intermediate device is a switch device logically arranged between said at least one terminal forming a client and a plurality of server devices each forming said file server;
said switch device receiving a file access request from said client; said switch device distributing said file access request to appropriate server devices and transmitting said file access request; said switch device receiving a response to said file access request transmitted from said server devices to transfer said response to said at least one terminal which transmitted said file access request.

11. The file access service system according to claim 10, wherein said switch device stores and supervises, as said pseudo file system information, junction information connecting directory trees constituting a unified single directory tree combined from said directory trees of said plurality of said file systems, as said pseudo file system information.

12. A method for taking a backup in a file access service system said method comprising the steps of:
an intermediate device distributing a command that starts to generate a snapshot which is a fixed image of a file system at a certain point in time, to a plurality of file servers;
said plurality of file servers receiving a command that starts to take said snapshots from said intermediate device to formulate respective snapshots;
said intermediate device making a connection across said plurality of said snapshots to generate a virtual snapshot, in which said plurality of said snapshots generated respectively by said plurality of file servers are arranged to have a directory tree structure in correspondence with said directory tree of said pseudo-file system at a time of said generation of said snapshots, and recording and managing tree information at a junction of each pair of said connected snapshots;
each of said plurality of said file servers recording and managing, as snapshot information in said file server, directory tree structure information other than said tree information at said junction of each pair of said connected snapshots, and
at least one of backup and restore being made using said virtual snapshot,
wherein said intermediate device performs name resolution processing for a tree node at said junction of each pair of said connected snapshots, and said plurality of file devices performs name resolution processing of tree nodes of said directory tree other than said junction of each pair of said connected snapshots,
wherein
said junction of each pair of said connected snapshots is a data structure, and comprises pointer information pointing to said connected snapshots,
said file access service system comprises at least one terminal,
said plurality of file servers includes a plurality of respective file systems,
said intermediate device is logically arranged between said at least one terminal and said plurality of file servers,
said intermediate device makes a connection across said plurality of said file systems into a single directory tree to construct a pseudo file system, and
said plurality of said file systems is thereby accessed as a single file system by said terminal through said intermediate device.

13. The backup taking method according to claim 12, further comprising the step of
said intermediate device holding link information of junctions connecting said snapshots as snapshot information corresponding to said pseudo-file system.

* * * * *